US007507947B2

(12) United States Patent
Bamji et al.

(10) Patent No.: US 7,507,947 B2
(45) Date of Patent: *Mar. 24, 2009

(54) METHOD AND SYSTEM TO DIFFERENTIALLY ENHANCE SENSOR DYNAMIC RANGE USING ENHANCED COMMON MODE RESET

(75) Inventors: Cyrus Bamji, Fremont, CA (US); Khaled Salama, Troy, NY (US)

(73) Assignee: Canesta, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/705,217

(22) Filed: Feb. 12, 2007

(65) Prior Publication Data

US 2008/0048100 A1    Feb. 28, 2008

Related U.S. Application Data

(63) Continuation of application No. 11/110,982, filed on Apr. 19, 2005, now Pat. No. 7,176,438.

(51) Int. Cl.
    *H01L 27/00* (2006.01)

(52) U.S. Cl. .............................. 250/214 A; 250/214 R

(58) Field of Classification Search ............... 250/208.1, 250/214.1, 214 A, 214 R; 348/294, 301, 348/302, 308, 396
See application file for complete search history.

(56) References Cited

U.S. PATENT DOCUMENTS 7,176,438 B2 * 2/2007 Bamji et al. ............ 250/214 A

* cited by examiner

*Primary Examiner*—John R Lee
(74) *Attorney, Agent, or Firm*—Canesta, Inc.; Michael A. Kaufman, Esq.

(57) ABSTRACT

Effective differential dynamic range and common mode rejection in a differential pixel detector are enhanced by capturing and isolating differential detector charge output before using common mode reset to avoid detector saturation due to common mode components of optical energy to be detected. Differential charge is stored into an integration capacitor associated with an operational amplifier coupled to receive as input the differential detector outputs. Common mode reset is achieved by setting storage capacitors coupled to the outputs of the differential detector at least once within an integration time T before storage potential exceeds a saturation voltage $V_{sat}$ for the photodetector.

17 Claims, 17 Drawing Sheets

METHOD AND SYSTEM TO DIFFERENTIALLY ENHANCE SENSOR DYNAMIC RANGE USING ENHANCED COMMON MODE RESET

CROSS-REFERENCES TO RELATED APPLICATIONS

Priority is claimed from applicants' U.S. utility patent application entitled Method and System to Differentially Enhance Sensor Dynamic Range Using Enhanced Common Mode Reset, application Ser. No. 11/110,982, soon to issue as U.S. Pat. No. 7,174,438 (2007). This parent application depended from application Ser. No. 10/823,415, now U.S. Pat. No. 6,919,549 (2005).

FIELD OF THE INVENTION

The invention relates generally to optical sensors, and more particularly to enhancing dynamic range and common mode rejection characteristics of such sensors, while allowing the sensors to be fabricated using CMOS techniques.

BACKGROUND OF THE INVENTION

Systems that rely upon sensing optical energy to discern information are known in the art and have many applications. Exemplary applications might include an optical-based system to determine range between the system and a target object, or to identify and recognize features of a target object. Many such systems acquire two-dimensional or intensity-based information, and rely upon an intensity image of light reflected from a target object. Such luminosity-based systems can use ambient light falling upon the target object, or may actively generate light that is directed toward the target object.

Unfortunately, it is difficult to accurately determine distance solely from the amplitude and brightness of an intensity image. For example, in a range finding system, a highly reflecting target object that is father away from the system can produce a greater amplitude signal than a nearer target object that is less reflective. The result would be that the more distant, shiny, object is erroneously reported as being closer to the system than the closer, duller, object. In a range finding system used to control robot machinery in an industrial setting, such errors may be intolerable for reasons of safety to nearby human operators. If such a system is used to identify and recognize different target objects, an object might be misidentified. Simply stated, two-dimensional intensity-based systems are very prone to measurement error.

The present invention may be used in a wide range of applications including, but not limited to, range finding systems. It may be useful at this juncture to briefly review such systems.

U.S. Pat. No. 6,323,942 ("the '942 patent") to Bamji et al. entitled CMOS-COMPATIBLE THREE-DIMENSIONAL IMAGE SENSOR IC describes a three-dimensional range finding system that can determine range distance without reliance upon luminosity-based data, the entire content of which patent is incorporated herein by this reference. As disclosed in the '942 patent, such a system generates a depth map that contains the distance Z from each pixel in a CMOS-compatible sensor array to a corresponding location on a target object. Applicants refer to and incorporate by reference the '942 patent as background material. U.S. Pat. No. 6,580,496 ("the '496 patent") to Bamji et al. entitled SYSTEMS FOR CMOS-COMPATIBLE THREE-DIMENSIONAL IMAGE SENSING USING QUANTUM EFFICIENCY MODULATION describes the use of quantum modulation techniques and differential detectors suitable for a three-dimensional range finding system, the entire content of which patent is incorporated herein by this reference. In the '496 patent the quantum efficiency of the substrate upon which differential CMOS sensors were fabricated was modulated synchronously with optical energy emitted from an energy source. Applicants refer to and incorporate by reference the '496 patent as background material.

FIG. 1 is a block diagram of a three-dimensional range finding system 10 as exemplified by the '942 patent or the '496 patent. Such systems determine distance Z between the system and locations on target object 20. System 10 may be fabricated upon a single IC 30, requires no moving parts, and relatively few off-chip components, primarily a source of optical energy 40, e.g., a light emitting diode (LED) or laser source, and associated optics 50. If desired, laser source 40 might be bonded onto the common substrate upon which IC 30 is fabricated.

System 10 includes an array 60 of pixel detectors 70, each of which has dedicated circuitry 80 for processing detection charge output by the associated detector. As used herein, the terms "detector", "photodiode detector", "pixel" and "pixel detector" may be used interchangeably. Array 60 might include 100×100 pixels 70, and 100×100 associated detector processing circuits 80. One will appreciate that other configurations may be used. IC 30 preferably also includes a microprocessor or microcontroller unit 90, RAM and ROM memory, collectively 100, a high-speed distributable clock 110, and various computing and input/output (I/O) circuitry 120. System 10 preferably further includes a lens 130 to focus light reflected from target object 20 upon pixels 70 in array 60. As noted in the above-mentioned patents, controller unit 90 may carryout distance-to-object and object velocity calculations and can output such calculations as DATA, for use by a companion device, if desired. As seen in FIG. 1, substantially all of system 10 may be fabricated upon CMOS IC 30, which enables shorter signal paths, and reduced processing and delay times. Also shown in FIG. 1 is ambient light that is present in the environment in which system 10 and target object 20 are found. As described herein, high levels of ambient light relative to levels of light from energy source 40 can be detrimental to reliable operation of system 10.

In brief, microprocessor 90 can calculate the roundtrip time for optical energy from source 40 to travel to target object 20 and be reflected back to a pixel 70 within array 60. This time-of-flight (TOF) is given by the following relationship:

$$Z = C \cdot t / 2 \qquad \text{eq. (1):}$$

where C is velocity of light.

Thus, without reliance upon luminosity information, system 10 can calculate that $Z1=C \cdot t1/2$, $Z2=C \cdot t2/2$, $Z2=C \cdot t3/2$, and so on. The correct Z distances are obtained, even if more distant regions of target object 20 happen to be more reflective than nearer regions of the target object.

The ability of system 10 to determine proper TOF distances Z can be impacted when the magnitude of ambient light is large relative to the magnitude of reflected light from source 40. What occurs is that the various pixels 70 respond to incoming optical energy that represents the real signal to be measured (e.g., active energy originating from source 40 and reflected by target object 20), and also respond to ambient light. The depth resolution of each pixel, i.e., the accuracy of the distance measurement, is determined by the system signal-to-noise ratio (SNR). Even if ambient light could be measured and subtracted from the total signal, its noise component (e.g., shot noise) would still degrade system performance. Further, the presence of ambient light can have even more severe consequences by causing the pixel detector to saturate.

In a so-called differential pixel detector, the active optical energy contributes to both a differential mode signal and a common mode signal, while ambient light only contributes to the common mode signal. While differential pixel detectors can exhibit higher SNR than single-ended pixel detectors, the presence of strong ambient light, sunlight perhaps, can degrade the performance of differential pixel detectors, as will now be described. As used herein, the term "differential detector" refers to a detector that responds to two input parameters. For example in the '496 patent, the differential detectors responded to amplitude of incoming optical energy and to phase of such energy relative to energy output by emitter 40; see FIG. 1 herein. Typically the singular term "pixel" will refer to a pair of differential photodetectors, for example first and second photodiode detectors $D_A$ and $D_B$.

Incoming optical energy falling upon a pixel detector 70 generates an extremely small amount of photocurrent (or photocharge), typically on the order of picoamps ($10^{-12}$ amps). Such detection current signals are too small in magnitude to be measured directly. It is known in the art to provide pixel detectors that operate in a direct integration mode by which optical energy induced photocurrent is integrated on a capacitor and the final capacitor charge or voltage is readout at the end of an integration interval. A capacitor $C_x$ has finite maximum charge capacity $Q_{max}$ defined by:

$$Q_{max} = C_x \cdot V_{swing} \qquad \text{eq. (2):}$$

where $C_x$ is the total capacitance and $V_{swing}$ is the maximum voltage swing across the capacitor. A pixel detector is said to be in saturation when the total charge integrated on the capacitor exceeds the maximum charge capacity, in which case no useful information can be readout from that pixel.

A differential pixel detector (e.g., detectors 70 in FIG. 1) may be represented as shown generically in FIG. 2A, in which modulation circuitry has been omitted for simplicity. Each pixel 70 has a differential structure with two perhaps identical reset and readout circuit components denoted A and B. Components A and B may be considered as part of the pixel 70 or as part of the pixel's associated circuitry 80. For ease of depictions, the photodetector pair comprising each differential pixel 70 is shown as photodiodes $D_A$ and $D_B$, but other detector structures could be used instead, for example photogate structures. Capacitors $C_A$ and $C_B$ are shown in parallel with diodes $D_A$ and $D_B$ and represent detector parasitic capacitance and/or dedicated fixed value capacitors.

Referring briefly to FIG. 1, within system 10 microprocessor 90 causes optical energy source 40 to emit pulses of light that are directed by lens 50 toward target object 20. Some of this optical energy will be reflected back towards system 10 and will be focused by lens 130 onto pixels 70 within array 60. Incoming photon energy falling upon a detector 70 will cause photodetector pair $D_A$ and $D_B$ to generate a small amount of detection signal current that can be directly integrated by capacitors $C_A$ and $C_B$. Before the start of integration, microprocessor 90, which may (but need not be) implemented on IC chip 30, will cause photodetectors $D_A$ and $D_B$ and their respective capacitors $C_A$ and $C_B$ to be reset to a reference voltage $V_{ref}$. For the components shown in FIG. 2A, reset is caused by raising a reset signal $\Phi_{reset}$ (see FIG. 2B). During the integration time, photocurrent generated by detectors $D_A$ and $D_B$ respectively discharge associated capacitors $C_A$, $C_B$, as shown in FIG. 2B. During the integration time, the voltage seen at nodes $S_A$, $S_B$ will decrease as a function of the photocurrent generated by the associated photodiode $D_A$, $D_B$. The magnitude of the photodiode-generated photocurrent will be a function of the amount of light energy received by the respective pixel 70 in array 60 in that the amount of light received by the pixel determines the final voltage on nodes $S_A$ and $S_B$.

Readout circuitry is provided for circuit A and B, comprising transistors $T_{follower}$ and $T_{read}$. At the end of the integration time, which will be a function of the repetition rate of the optical pulses emitted from optical energy source 40, microprocessor 90 causes a readout signal $\Phi_{read}$ to go high. This enables the voltages on nodes $S_A$ and $S_B$ to be read-out of array 60, e.g., through a bitline. In the exemplary configuration of FIG. 2A, if the voltage on node $S_A$ or $S_B$ drops below a certain level denoted here as saturation voltage $V_{sat}$, the readout circuit cannot perform the reading operation properly. Therefore the dynamic range of such known differential pixel configuration shown in FIG. 2A is ($V_{ref}-V_{sat}$), as depicted in FIG. 2B. While the waveforms in FIG. 2B depict a diminishing potential at nodes $S_A$, $S_B$ as a function of photocurrent, one could instead configure the detector circuitry to charge rather than discharge a reference node potential.

But in addition to generating photocurrent in response to optical energy or active light (from emitter 40) reflected by target object 20, pixel 70 will also generate photocurrent in response to ambient light that is also integrated by capacitors $C_A$, $C_B$, thus affecting the potential at nodes $S_A$, $S_B$. FIG. 2B depicts two examples, showing the effect of relatively low magnitude ambient light, and relatively high magnitude of ambient light. In range finding applications, the difference ($A_{final}-B_{final}$) generally contains range information, and common mode is of lesser importance. As shown in FIG. 2B, relatively weak ambient light does not cause the pixel to saturate, and at the end of integration time, the final voltages read-out from the pixel are above $V_{sat}$. But relatively strong ambient light discharges the associated capacitor potential rapidly, which saturates the pixel. Due to the saturation condition, the pixel does not output any useful result in that the differential voltage, which contained range information, is now zero. Thus, a very real problem with prior differential pixel detectors is that the dynamic range of the pixel is not sufficient to handle strong ambient light.

Thus, whereas CMOS sensors used in systems to acquire images generally rely upon strong levels of ambient light, CMOS sensors used in time-of-flight systems seek to reduce the effects of ambient light. As seen in FIG. 2B, the magnitude of ambient light can overwhelm detection of reflected optical energy, saturating the detectors. Image acquisition systems and time-of-flight systems that must function in environments exposed to strong ambient light or minimal ambient light may require a sensor dynamic range exceeding about 100 dB. In time-of-flight and similar applications in which ambient light is unnecessary, the detection effects of ambient light can be substantially reduced electronically. For example, the above-mentioned U.S. patent application Ser. No. 10/823,415 described various common mode reset techniques to substantially eliminate the effects of ambient light, as well as the effects of dark current. That application also disclosed techniques to mitigate the effects of low modulation contrast. As noted therein, common mode reset techniques reset common mode values to a fixed magnitude, while preserving differential mode detection signals on a per pixel photodiode detector basis.

Thus there is a need for a method and topology by which the dynamic range of a differential pixel detector can be enhanced such that degradation from ambient light is substantially reduced. Even in the presence of strong ambient light that might otherwise saturate the pixel, the differential response of the pixel should still be available. Preferably substantially all of the common mode signal should be removed, while retaining substantially all of the differential mode detection signals on a per pixel photodiode detector basis. Preferably such method and topology should introduce little or no KT/C capacitor noise, other than for parasitic capacitance effects. Finally, such method and topology should be implementable using CMOS such that the differential sensor array can still be fabricated on a common IC with associated range finding system.

Embodiments of the present invention provide such methods and circuit topologies.

SUMMARY OF THE INVENTION

In the embodiments of the above-mentioned U.S. patent application Ser. No. 10/823,415 effective differential dynamic range in a differential pixel detector was increased by avoiding saturation effects due to common mode contribution in optical energy to be detected. Photocurrent generated by each photodetector pair was directly integrated by an associated capacitor over an integration time T. The resultant capacitor voltage was proportional to detected optical energy including ambient light. Within time T, before either integrated capacitor voltage reaches $V_{sat}$ for the photodetector, at least one of the capacitors was reset to a voltage such that the desired differential detector signal is still determinable.

In one embodiment of that parent invention, at start of integration time T, the voltage across each capacitor was preset to a fixed $V_{ref}$ voltage. During integration time T whenever the integrated capacitor voltage of either capacitor reached $V_{sat}$, that capacitor was reset to $V_{ref}$. After reset, capacitor voltages were again allowed to change as a function of photocurrent, and were reset to $V_{ref}$ whenever and as soon as either capacitor voltage reached $V_{sat}$. A count of total resets for each capacitor was maintained, and the amount of light falling upon each detector was a function of its final voltage at end of integration and the number of resets occurring during integration. In another embodiment of that parent invention, the common mode component of the integrated capacitor voltages was reset periodically to prevent either photodiode detector from saturating. However the differential component of the integrated capacitor voltages was preserved. The result was to extend effective differential dynamic range of the differential sensor in the presence of ambient light by avoiding the effects of saturation. Embodiments of the parent invention could extend differential dynamic range of the differential sensor despite mismatching in the components implementing the differential pixel detector.

The present invention improves upon both rejection of common mode signal and retention of the desired differential detection signal in a CMOS-compatible differential detector. These advantages are realized with acceptably low KT/C noise due to capacitance. In one embodiment, at least a substantial fraction (e.g., $\geq 50\%$) of the total differential detection signal charge is read into at least one integration capacitor on each so-called charge dump cycle operation. Preferably this functionality is implemented by coupling the photodetector differential inputs to the inputs of an operational amplifier configured as an integrator using an integration capacitor. Common mode reset is implemented by periodically engaging switch transistors such that the differential detector signal is first transferred and stored into the integration capacitor and is essentially zero during common mode resets. One result is improved common mode rejection, with little or no differential detection signal charge loss. Further, such detection signal charge loss as may occur is substantially independent of the number of common mode resets. A single-ended output is available from the operational amplifier, which may be read-out via an associated bitline.

In overview, operation of the present invention during an integration period T involves a number n of common mode reset operations, and a number x of dumps (or transfers-out) of the differential charge from capacitors associated with each differential pixel detector into the integration capacitor associated with the operational amplifier. Once dumped, the differential charge is stored in the integrator capacitor and is not affected by subsequent common mode resets. The number of dumps x may be less than or equal to or even greater than n. However in a preferred mode of operation, there will be a dump of differential charge before a common mode reset.

Other features and advantages of the invention will appear from the following description in which the preferred embodiments have been set forth in detail, in conjunction with the accompanying drawings.

DETAILED DESCRIPTION OF THE INVENTION

Figure 11:
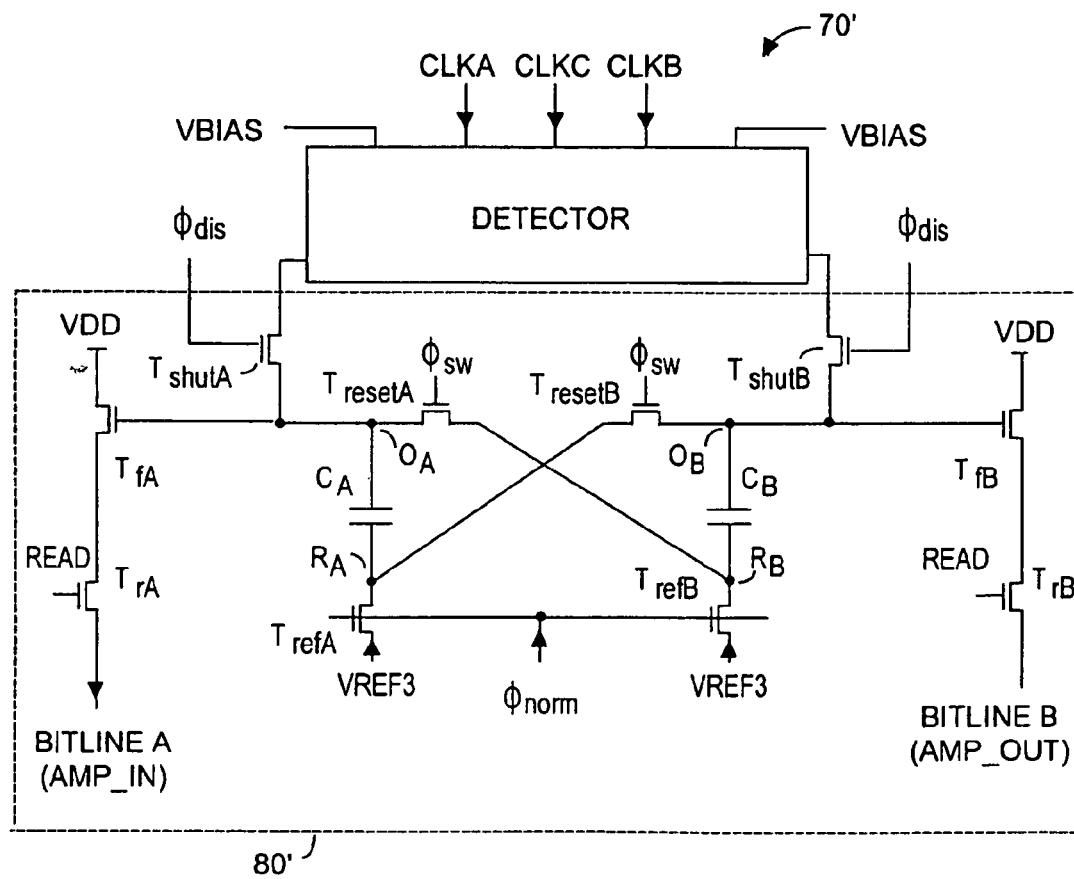
FIG. 11 depicts an embodiment of a differential common mode resettable sensor and associated switching transistors showing problem nodes, according to the present invention.

Before describing the present invention, whose description commences with an analysis of FIG. 11, it will be useful to review various embodiments of the parent invention, the above-mentioned U.S. patent application Ser. No. 10/823, 415. While the parent invention and the present invention will be described in conjunction with the preferred embodiments, it will be understood that they are not intended to limit the invention to those embodiments. On the contrary, the parent invention like the present invention is intended to cover alternatives, modifications and equivalents, which may be included within the spirit and scope of the invention as defined by the appended claims.

Figure 1:
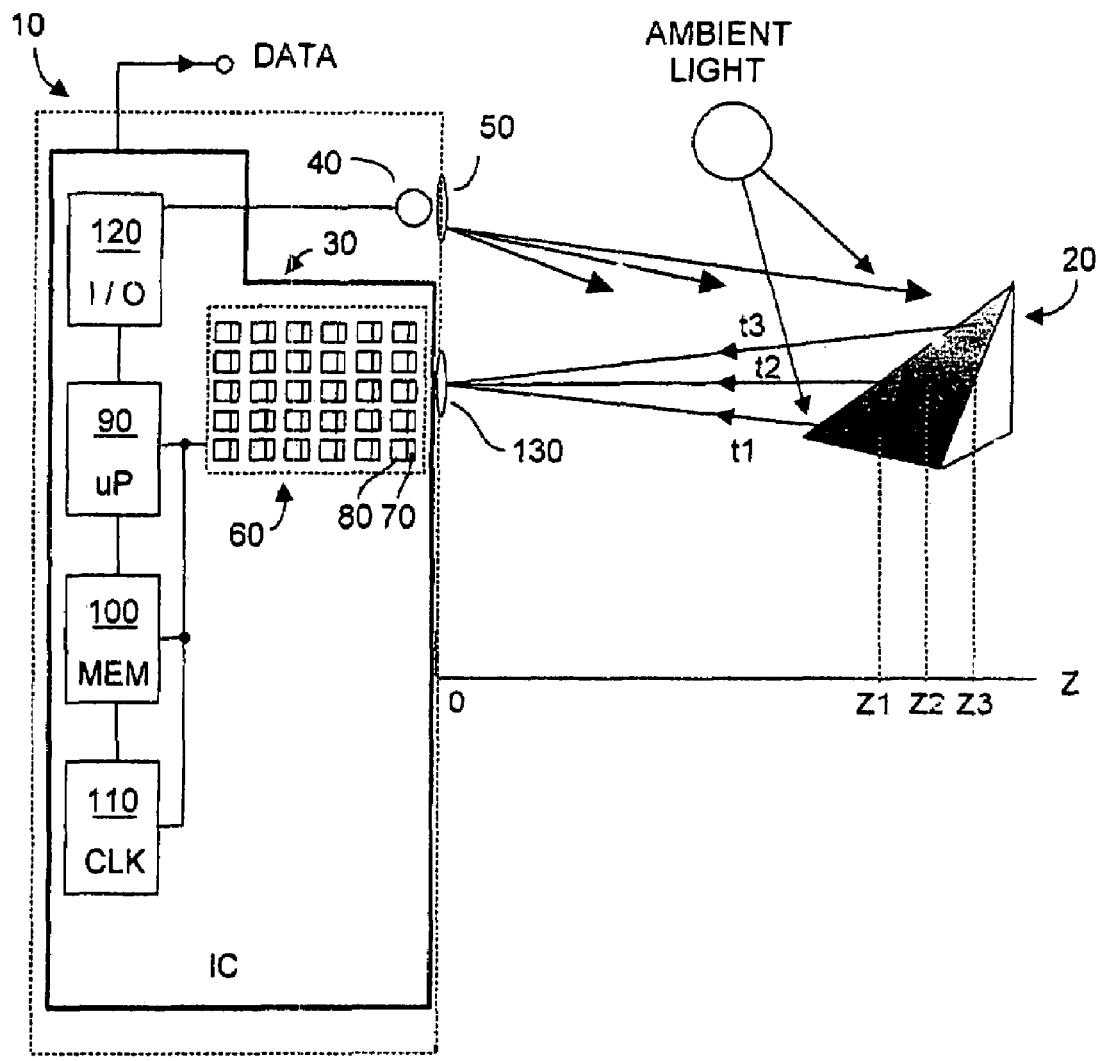
FIG. 1 depicts a three-dimension TOF system using conventional pixel detectors as exemplified by the '942 patent and the '496 patent.
Figure 3A:
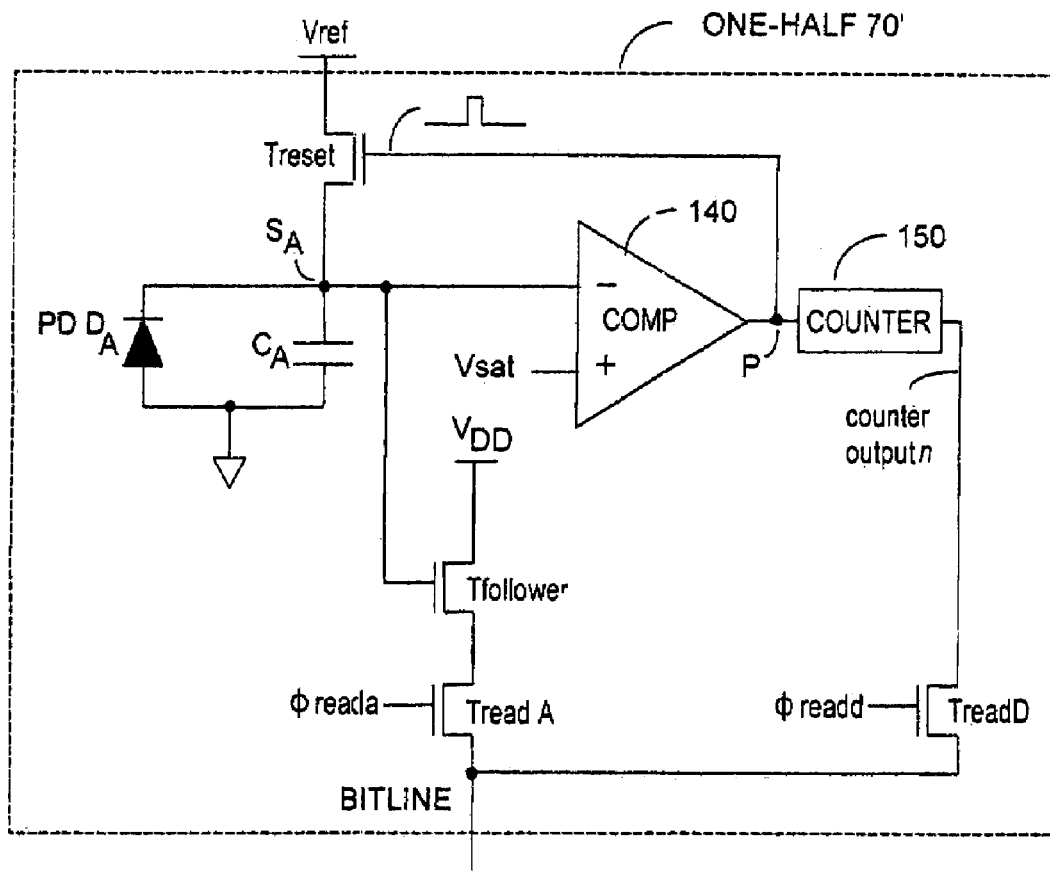
FIG. 3A depicts one-half of a self-resetting differential pixel detector according to an embodiment of the present invention.

FIG. 3A depicts one-half of differential pixel detector 70', where it is understood that system 10 in FIG. 1 might now employ an array 60 of rows and columns of differential pixel detectors 70' in lieu of prior pixel detectors 70. In FIG. 3A, only one of the two pixels is shown for ease of illustration, namely photodetector $D_A$ (denoted PD $D_A$). Associated with each photodetector in the pixel is a capacitor, $C_A$ being associated with $D_A$, where $C_A$ can be the capacitance inherent with $D_A$, and/or a discrete capacitor. In a conventional configuration, in the presence of a signal, typically ambient light, the voltage across $C_A$ would decrease until a saturation voltage $V_{sat}$ was attained, at which point an output signal from $D_A$ would be meaningless.

Figure 3B:
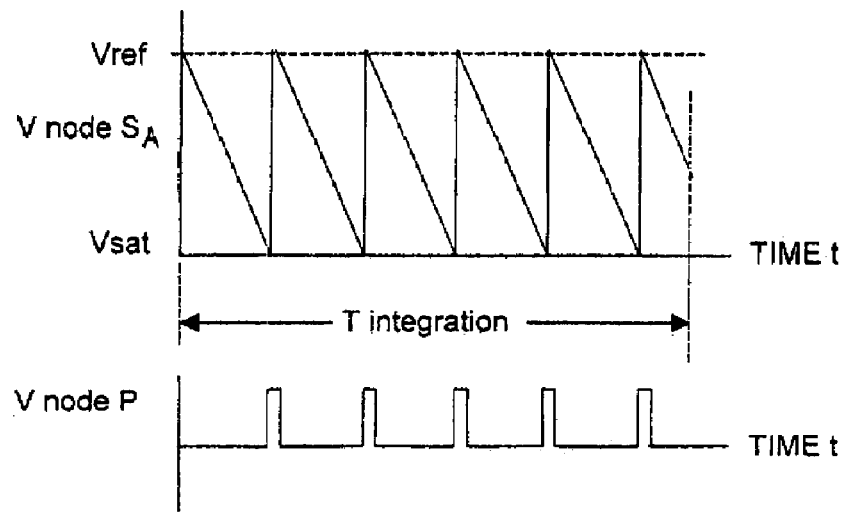
FIG. 3B depicts waveforms present in the detector of FIG. 3A, according to an embodiment of the present invention.

But as shown by the waveforms in FIG. 3B, the voltage at node $S_A$, e.g., the voltage across $C_A$ and across $D_A$, is prevented from exceeding $V_{sat}$ by resetting the node voltage to a fixed reference $V_{ref}$ whenever $V_{sat}$ is attained. Each differential pixel detector 70' includes two photodiodes and two capacitors, and each capacitor-photodiode node is independently reset to $V_{ref}$ as soon as the voltage across either capacitor reaches $V_{sat}$.

In FIG. 3A, a comparator 140 compares the voltage signal from photodiode $D_A$ present at node $S_A$ to $V_{ref}$. As soon as the $S_A$ potential reaches $V_{ref}$, comparator 140 changes state, going from low-to-high for the configuration shown. Thus when $VS_A > V_{sat}$, the output from comparator 140 turns-on a reset transistor $T_{reset}$ coupled between node $S_A$ and $V_{ref}$. The potential $VS_A$ at node $S_A$ is reset by being pulled from $V_{sat}$ to $V_{ref}$. The desired result is that overall dynamic range of pixel detector 70' is increased.

Returning to FIGS. 3A and 3B, the output from comparator 140 (node P) is also input to a counter 150 that essentially will count the number of resets that occur for the detector. It is understood that as FIG. 3A depicts half of a differential pixel detector, there will be two comparators, two counters, and two sets of switching transistors for each differential pixel detector 70'. The photodiode signal at node $S_A$ is coupled via a high input impedance voltage follower transistor $T_{follower}$, whose output is read via a bitline when a $\Phi_{readA}$ signal goes high (for the configuration shown). An additional row selection transistor $T_{readD}$ is coupled between the output from counter 150 and the bitline signal, and is turned on when a $\Phi_{readD}$ signal goes high (for the configuration shown). Note that a feedback path exists between the comparator output and the gate for reset transistor $T_{reset}$. Those skilled in the art will appreciate that means other than the above described solid state switches, comparators, counters, etc., may be used to implement similar embodiments of the present invention.

Referring briefly to FIG. 1, optical energy source 40 typically outputs a pulse train of optical energy, which energy may be modulated, for example according to the '496 patent. The pulse train will have a period between adjacent output pulses. Within differential detector 70', the maximum period of integration is made less than the period between adjacent pulses of optical energy emitted by source 40. Referring back to FIGS. 3A and 3B, during integration in the present of strong ambient light, sunlight perhaps, the voltage at node $S_A$ across $C_A$ continues to decrease in magnitude until $V_{sat}$ is reached. At that moment, comparator 140 changes states, emitting a short output pulse that is present at node P. This pulse turns-on reset transistor $T_{reset}$ for a short time, causing $C_A$ to be again reset to voltage $V_{ref}$. Such reset is self-triggering, and can occur multiple times during the integration interval. The total number of such resets is recorded by counter 150, there being one counter for each of the two photodiode detectors in a differential pixel detector 70'.

At the end of the integration time, the counter value (n) and the final voltage $V_{final}$ on capacitor $C_A$ are read-out separately by turning-on $T_{readD}$ and $T_{readA}$, respectively. FIG. 3A is conceptual in that while counter 150 is shown being read-out as though its counter n were an analog value, in practice the digital counter will be read-out with a bus. The signal waveforms for node $S_A$ and the comparator output at node P are shown in FIG. 3B. Note that the effective voltage swing on node $S_A$ is $V_{swing} = n(V_{ref} - V_{sat}) + V_{final}$, which is n times larger than the maximum voltage swing ($V_{ref}-V_{sat}$) of known differential sensors. Thus using the self-resetting configuration of FIG. 3A, capacity is extended by n times, where n is the number of self-resets occurring during integration. The resultant extended maximum charge capacity for the photodiode enables the pixel sensor to detect differential mode signals even in the present of very strong ambient light.

Figure 3C:
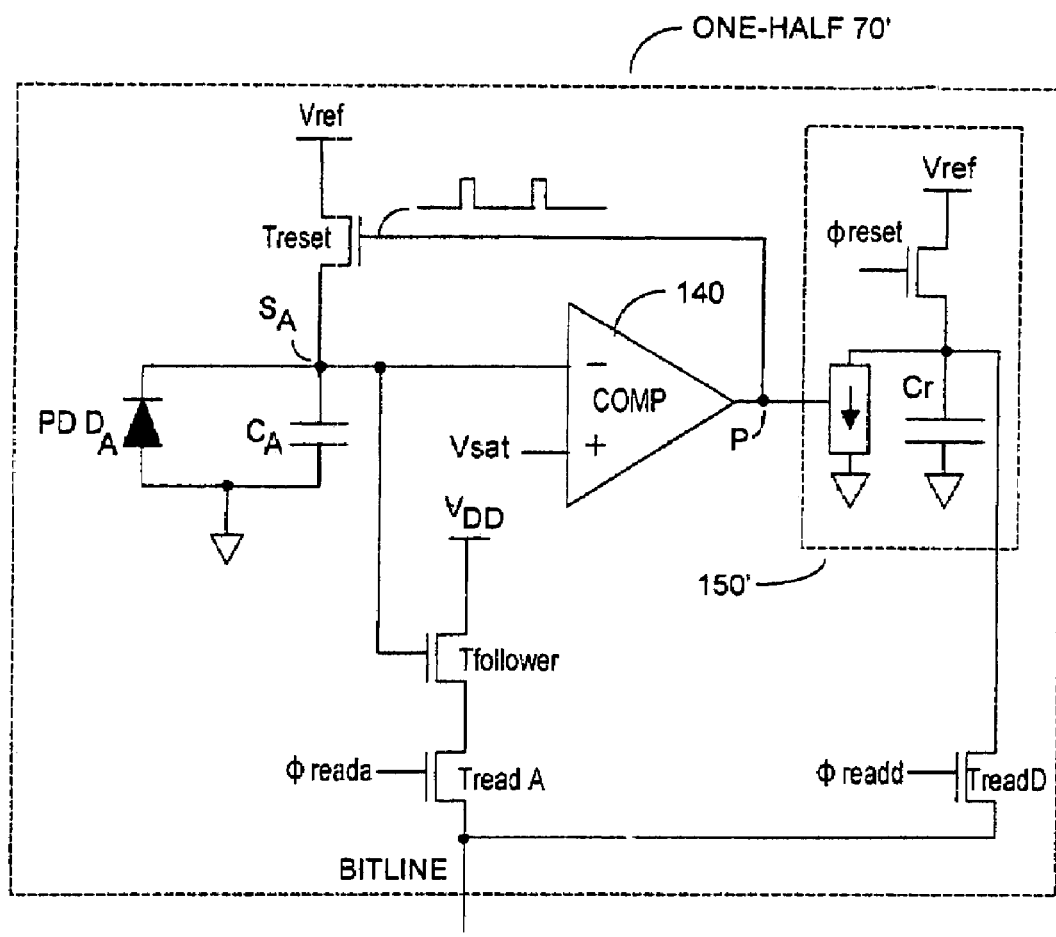
FIG. 3C depicts one-half of a self-resetting differential pixel detector implemented with an analog counter, according to an embodiment of the present invention.

While FIG. 3A has been described with respect to use of a counter 150 that operates digitally, the role of counter 150 can instead be implemented in analog fashion. FIG. 3C depicts such an implementation, in which an analog charge pump products an analog voltage value proportional to n. Such an analog circuit can be implemented using small area on an IC, e.g., IC 30 in FIG. 1, where conventional detectors 70 are replaced by detectors 70' according to the present invention.

In FIG. 3C, a current source changes voltage across a capacitor $C_r$, where each time a reset pulse (of fixed duration) is generated by comparator 140, the current source is turned on. Thus for each comparator reset pulse, a fixed amount of charge is injected into capacitor $C_r$, altering the voltage across the capacitor by $\Delta V_r$. At the end of the integration time, the voltage on capacitor Cr changes by an amount equal to $\Delta V_r$ times the number of reset pulses n that occurred during integration. It is possible to determine n by $n=(V_{ref}-V_r)/\Delta V_r$. Note that capacitor $C_r$ is also initialized to $V_{ref}$ when the photodetector is initialized. If desired, an initial voltage other than $V_{ref}$ could be used for capacitor $C_r$.

In FIG. 3C, photodetector $D_A$ can be reset by using the non-inverting input of comparator 140, which input normally is set to $V_{sat}$. But this non-inverting input can be used to perform an initial (frame) reset before integration. For example, during the initial reset period this input can be switched to $V_{DD}$, which will cause the comparator to output a pulse at node P that resets $T_{reset}$ and thus resets photodetector $D_A$ and its associated capacitor $C_A$. Thereafter the non-inverting node of comparator 140 can be returned to $V_{sat}$ to remain at that potential until the next (frame) reset. By judiciously making voltage $V_{sat}$ low, all photodetectors are simultaneously reset, thus removing the need for a separate reset signal.

Figure 4A:
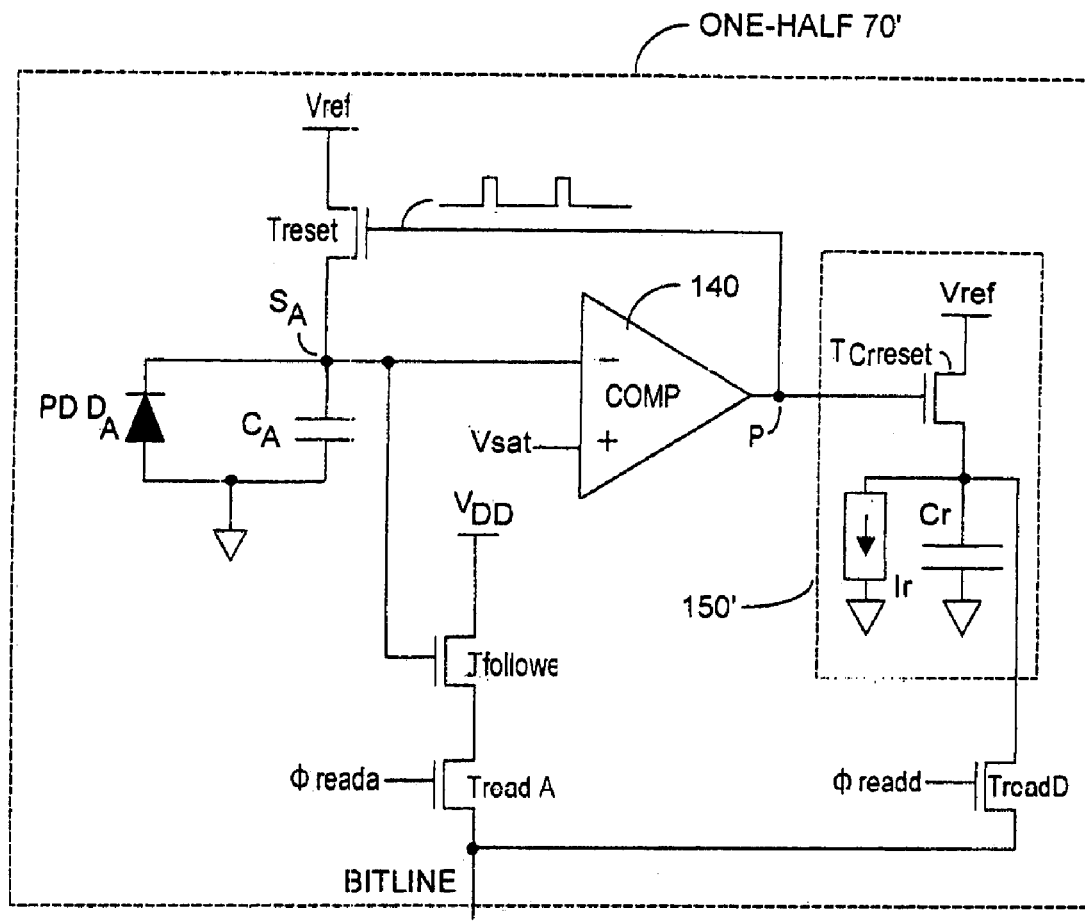
FIG. 4A depicts one-half of a self-resetting differential pixel detector using an analog counter with reset, according to an embodiment of the present invention.
Figure 4B:
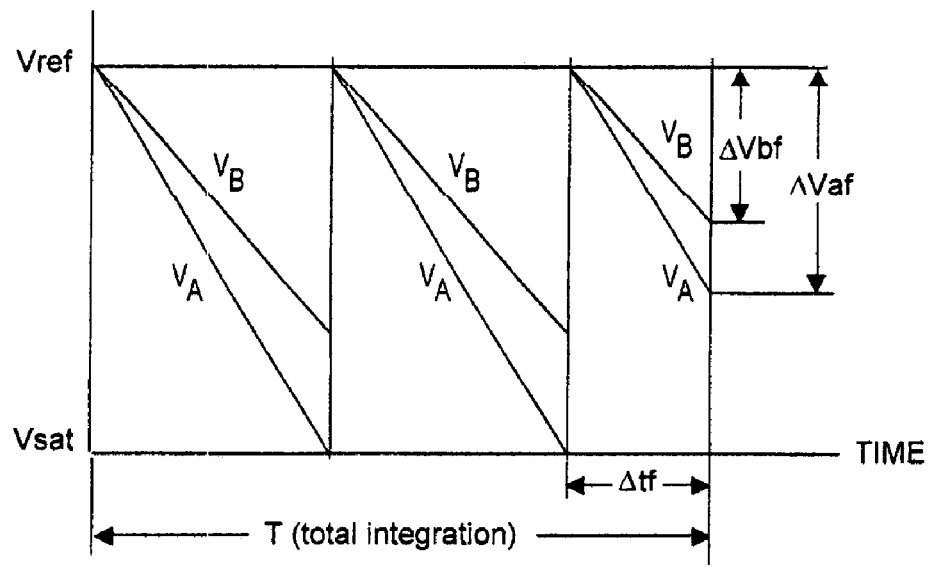
FIG. 4B depicts waveforms for a differential time to saturation counter as shown in FIG. 4A, according to an embodiment of the present invention.

Turning now to FIGS. 4A and 4B, an embodiment of a differential comparator is described in which a differential time to saturation counter is employed. In the block diagram of FIG. 4A a single detector PD $D_A$ is shown, although it is understood that a complete differential pixel detector 70' will comprise two detector diodes (or the like), two comparators, a counter, and associated reset and read-out transistors. In FIG. 4A, while counter 150' is shown implemented with analog components, a counter could instead be implemented to function digitally.

At start of integration, counter 150' starts counting to measure the time since the last reset to $V_{ref}$. In the following discussion it will be assumed that the magnitude of incoming ambient light does not change substantially during the integration time. Two scenarios will be considered: ambient light is strong, and ambient light is not very strong.

If the ambient light is strong, each photodetector $D_A$ and $D_B$ ($D_B$ not shown) will reach $V_{sat}$ multiple times during one integration period. In this case, every time either photodetector reaches $V_{sat}$, the photodetectors and counter 150' are simultaneously reset. At the end of the integration period, each photodetector will be at a determinable voltage level, which level will likely be different for each detector. Further, at the end of the integration period, the counter will have stored the time ($\Delta tf$) since the last reset required for the photodetectors to attain these final voltage levels. Since each photodetector end-of-integration voltage level is known, as is the time $\Delta tf$, the slope of the voltage curves for each photodetector and the number of resets that should have occurred during integration can be determined; see FIG. 4B. Note at the right-hand side of FIG. 4B that the final photodiode voltages are ($V_{ref}-\Delta V_{af}$) and ($V_{ref}-\Delta V_{bf}$) for photodiodes $D_A$ and $D_B$ respectively. Subtracting these magnitudes from $V_{ref}$ yields $\Delta V_{af}$ and $\Delta V_{bf}$. The total swing can be calculated as follows:

$$V_{swing-a}=\Delta V_{af} \cdot T/\Delta tf \qquad \text{eq. (3):}$$

$$V_{swing-b}=\Delta V_{bf} \cdot T/\Delta tf \qquad \text{eq. (4):}$$

where T is the total integration time, which is known.

If the ambient light is not strong, at the end of the integration time T, the counter value will be equal to the integration time, and the voltages across the photodiodes $D_A$ and $D_B$ will represent all that the photocharge each pixel could collect during the whole integration time. In this case, no further calculation is needed to determine the total voltages, since it follows from $T=\Delta tf$ that:

$$V_{swing-a}=\Delta V_{af} \qquad \text{eq. (5):}$$

$$V_{swing-b}=\Delta V_{bf} \qquad \text{eq. (6):}$$

Once the relevant times and photodiode voltages are read-out, an external computation unit, perhaps microprocessor 90 in system 10 (see FIG. 1) or pure logic circuitry can calculate to provide the differential signal.

As noted, in FIG. 4A an analog equivalent of a digital resettable counter 150' is used, in which a charge pump can be used to measure $\Delta tf$. A charge pump capacitor $C_r$ is reset by transistor $Tc_{rreset}$ each time photodiode voltage reaches $V_{sat}$. Thus at the end of time T, the voltage on $C_r$ is proportional to the time from the last reset to the end of integration. Assuming the constant current supplied to $C_r$ is $I_r$, then the final voltage on $C_r$ will be $V_r=V_{ref}-I_r \cdot \Delta tf/C_r$ and $\Delta tf$ can be determined as $\Delta tf=(V_{ref}-V_r) \cdot C_r/I_r$. In the above descriptions, two independent counters are present. However since only the counter causing the most recent reset is of use, both counters can be combined into a single counter. This single counter and the reset for both halves of the pixel detector could be controlled by the logical OR of both comparators.

As noted, capacitor $C_r$ is initialized at the beginning of integration along with the photodetector. As with the self-reset method, the non-inverting input of comparator 140 may be switched to $V_{DD}$ (rather than to $V_{sat}$ during integration) to reset pixel 70' (e.g., both photodetectors and $C_r$). By judiciously making voltage $V_{sat}$ low, all photodiodes are simultaneously reset, thus removing the need for a separate reset signal.

Figure 5A:
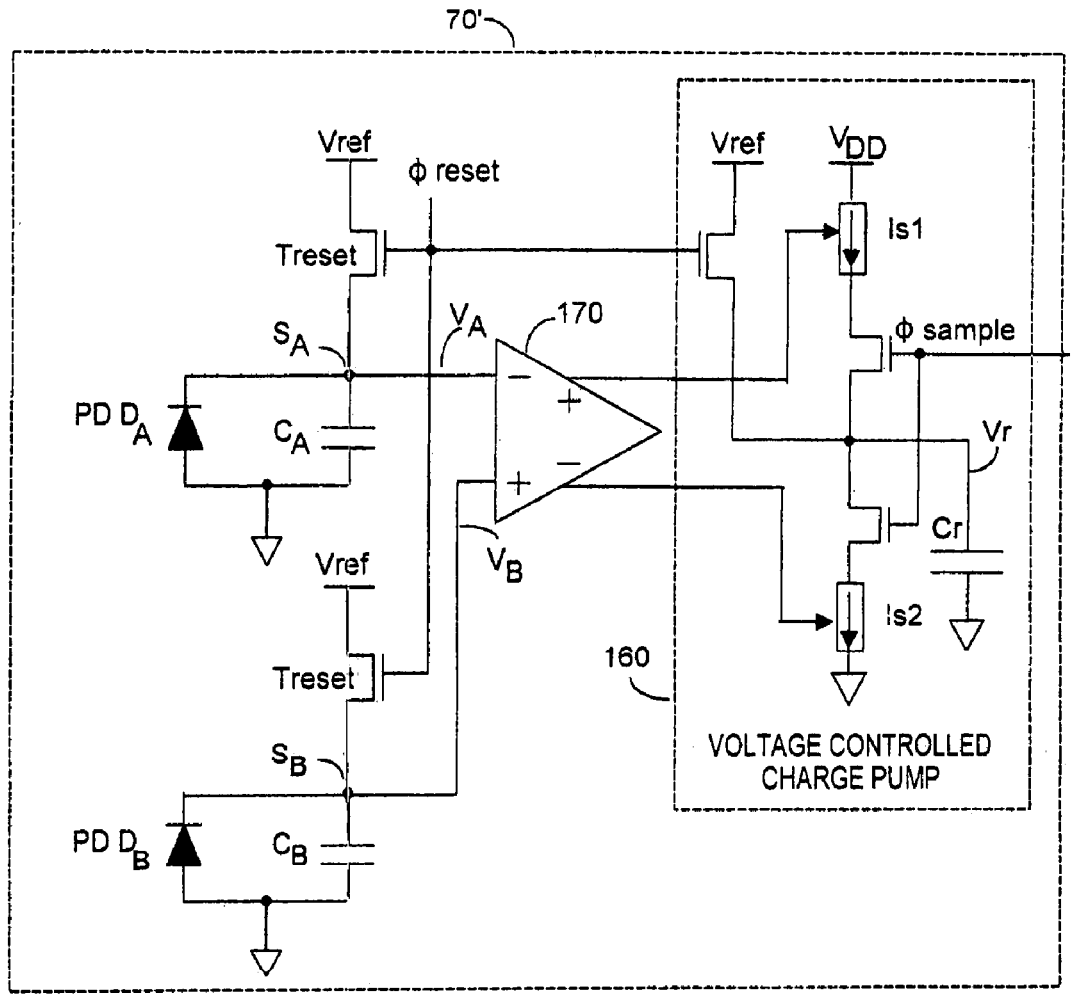
FIG. 5A depicts a differential pixel detector using a controlled charge pump, according to an embodiment of the present invention.
Figure 5B:
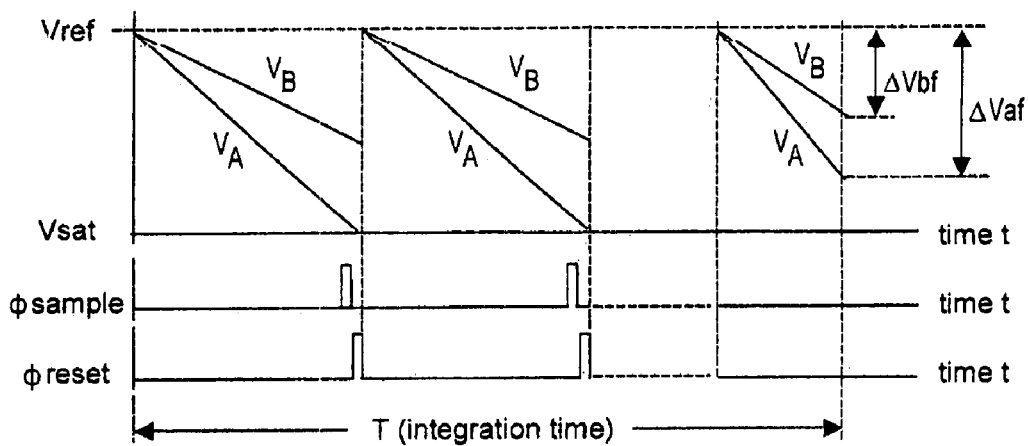
FIG. 5B depicts waveforms present in the detector of FIG. 5A, according to an embodiment of the present invention.

Turning now to FIGS. 5A and 5B an embodiment of the present invention is shown in differential pixel detector 70' includes a voltage controlled charge pump 160 to record voltage difference between the two differential photodetectors $D_A$ and $D_B$ before they are saturated by high common mode signal. Once the photodetector voltage difference has been recorded on a third capacitor $C_r$, photodetectors $D_A$ and $D_B$ and their associated capacitors ($C_A, C_B$) can be reset by the relevant reset transistors, and integration starts again.

In FIG. 5A, charge pump 160 includes two voltage controlled current sources $I_{s1}, I_{s2}$ and a capacitor $C_r$. Although the voltage difference between photodetectors $D_A$ and $D_B$ may be monitored continuously by differential amplifier 170, charge pump 160 is only turned-on for a fixed period of time. In this fashion, charge accumulated on capacitor $C_r$ during each sample is proportional to the voltage difference. After each sample, the differential photodetector is reset and a new integration cycle starts. The sampling frequency preferably depends upon incoming light intensity, e.g., optical energy falling upon photodetectors $D_A$ and $D_B$, which intensity can be estimated. The final charge on $C_r$ is the summation of the samples and is proportional to the total voltage difference between the differential photodetectors. FIG. 5B depicts control signal and voltage waveforms at various nodes in the configuration of FIG. 5A.

At the end of integration, three voltage values are read-out from pixel 70', namely $V_a$ (voltage across $D_A$), $V_b$ (voltage across $D_B$), and $V_r$ (voltage across capacitor $C_r$). Given these quantities, one can calculate the resulting differential voltage $V_{swing-a} - V_{swing-b}$ as follows. Looking at FIG. 5B, it is seen that $\Delta V_{af} = V_{ref} - V_a$ and that $\Delta V_{bf} = V_{ref} - V_b$. The differential voltage is then given by $V_{swing-a} - V_{swing-b} = \Delta V_{af} - \Delta V_{bf} + f(V_r)$, where $f(V_r)$ is a linear function of $V_r$.

This linear function $f(V_r)$ is obtained by writing $V_r$ as $V_r = V_{ref} + n \cdot k \cdot (V_a - V_b)$. As noted, $V_{ref}$ is the initial voltage for capacitor $C_r$ (e.g., the reset voltage for photodetectors $D_A$, $D_B$), n is the number of sample/reset cycles, and k is a constant determined from the circuit of FIG. 4A, and represents how much voltage change occurs on $C_r$ for given a unit voltage change in $(V_a - V_b)$. The amount contributing to $V_{swing-a} - V_{swing-b}$ is $n \cdot (V_a - V_b)$, which is equal to $n \cdot (V_a - V_b) = (V_r - V_{ref})/k = f(V_r)$. In summary the final differential voltage is calculated from known quantities, according to $V_{swing-a} - V_{swing-b} = V_b - V_a + (V_r - V_{ref})/k$. Common mode voltage can also be estimated from $\Delta V_{af}$ and $\Delta V_{bf}$ since the time between the last reset and the end of integration is known.

It is possible to automatically generate the $\Delta_{sample}$ or $\Delta_{reset}$ signals within each pixel 70', by providing some additional circuitry. One can use two comparators to compare $S_A$, $S_B$ node potentials with $V_{sat}$, and the logical OR can be taken of the comparator outputs to yield the $\Delta_{sample}$ signal. Thus as soon as either photodiode potential reaches $V_{sat}$, $\Delta_{sample}$ goes high. If desired, $\Delta_{reset}$ can be a delayed version of $\Delta_{sample}$. Such a self-resetting configuration would use two comparators, an OR gate, and a delay element that could be a simple RC delay.

Figure 6A:
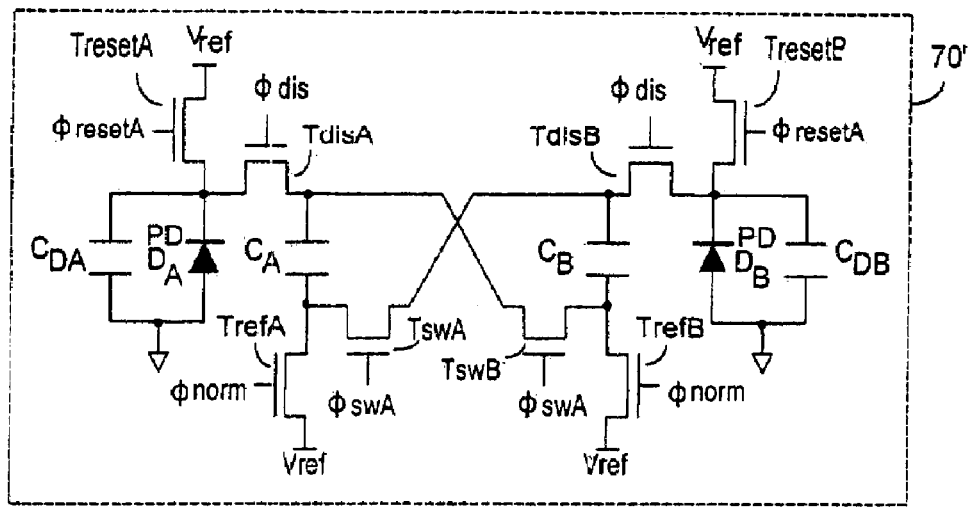
FIG. 6A depicts a common mode resettable differential pixel detector, according to an embodiment of the present invention.

Turning now to FIG. 6A, an embodiment of a differential pixel detector 70' is shown in which during reset operation capacitors acquire exactly the same charge in each half of the configuration. By adding exactly the same charge to each half of the configuration, common mode contribution is essentially removed and differential mode contribution is preserved. Such an approach offers several advantages. For example, extra resets do not affect the system operation, and the pixel detector may be reset even if it is not discharged. Further, capacitor or component mismatch has substantially no effect on the accuracy of the reset. In addition, it can be shown that common mode reset generates no KT/C noise in the differential domain. The only resulting KT/C contribution appears in common mode where it is unimportant.

For ease of illustration, FIG. 6A does not depict $Q_A$, which is the sum of the charge on the top plate of capacitors $C_A$ and $C_{DA}$, or $Q_B$, which is the sum of the charge on the top plate of capacitors $C_B$ and $C_{DB}$. In operation, the configuration of FIG. 6A preserves the differential quantity $Q_A - Q_B$ during the common mode reset operation, although the common mode quantity, $(Q_A + Q_B)/2$, is changed at each reset. What occurs is that after a reset, the quantity $(Q_A + Q_B)/2$ is moved closer to some constant $Q_{reset0}$. Thus in contrast to other reset approaches, additional resets have no adverse impact in FIG. 6A as they simply move the operating point for $(Q_A + Q_B)/2$ even closer to $Q_{reset0}$.

In normal operation switching transistors $T_{swA}$ and $T_{swB}$ are open, while transistors $T_{vrefA}$ and $T_{vrefB}$, and $T_{disA}$ and $T_{disB}$ are closed. Initially photodetector diodes $D_A$ and $D_B$ are reset to $V_{ref}$ via transistors $T_{resetA}$ and $T_{resetB}$, but during integration transistors $T_{resetA}$ and $T_{resetB}$ remain open. As optical energy impinges on photodiode $D_A$ it discharges its parasitic capacitor $C_{DA}$ as well as capacitor $C_A$, while photodiode $D_B$ discharges its parasitic capacitor $C_{DB}$ as well as its capacitor $C_B$. Initial reset is achieved though transistors $T_{resetA}$ and $T_{resetB}$, which initialize the circuit at potential $V_{ref}$, although other potential levels may instead be used.

Figure 6B:
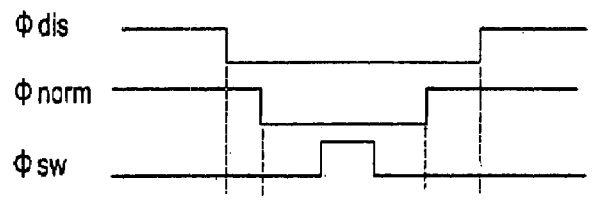
FIG. 6B depicts control waveforms present in the detector of FIG. 6A, according to an embodiment of the present invention.

During common mode reset, signal $\Phi_{resetA}$ remains low, while the other control signals operate as shown in FIG. 6B. During operation of pixel 70', the following steps take place:

(1) First, capacitors $C_A$ and $C_B$ are decoupled from associated photodiodes DA and DB by bring the $\Phi$dis signal low, which opens discharge transistors TdisA and TdisB going low. This operation does not change the differential charge quantity QA–QB, and no KT/C noise is introduced on QA–QB.

(2) Next, when control signal $\Phi$norm goes low, the bottom plates of capacitors $C_A$ and $C_B$ are decoupled from Vref by the opening of transistors TrefA and TrefB. The quantity QA–QB remains unaffected, even in terms of KT/C.

(3) When the control signal $\Phi$switch goes high, capacitors $C_A$ and $C_B$ redistribute their charge. Let $Q_{CA}$ be the charge on capacitor $C_A$ and let $Q_{CB}$ be the charge on capacitor $C_B$. If capacitors $C_A$ and $C_B$ are now shorted together in parallel the total charge quantity $Q_{CA} + Q_{CB}$ would be preserved. However since $C_B$ is connected to $C_A$ inverted, the quantity $Q_{CA} - Q_{CB}$ is preserved during this operation. Since no switches are opened no KT/C arises from this step.

(4) When the control signal $\Phi_{swA}$ goes low; a KT/C uncertainty appears in the charge redistribution, but this KT/C appears as common mode on the quantities $Q_{CA}$ and $Q_{CB}$. Any charge taken from $Q_{CA}$ shows up exactly on $Q_{CB}$ but with a minus sign. Thus after switches $T_{swA}$ and $T_{swB}$ open, $Q_{CA}' = Q_{CA} + \text{Noise}_{KTC}$, and $-Q_{CB}' = -Q_{CB} - \text{Noise}_{KTC}$. Thus there is no KT/C noise on $Q_{CA}' - Q_{CB}' = Q_{CA} - Q_{CB} + (\text{Noise}_{KTC} - \text{Noise}_{KTC})$.

(5) Next, when control signal $\Phi_{norm}$ goes high again the differential charge $Q_A - Q_B$ is unchanged.

(6) Finally, when control signal $\Phi_{dis\ goes}$ high, $Q_A - Q_B$ is unchanged.

If desired some of the above steps may be combined for simplicity. For example steps 5 and 6 may occur simultaneously or even out of sequence. Steps 1,2 and 5,6 clearly do not affect $Q_A - Q_B$, and it was demonstrated that steps 3 and 4 do not affect $Q_{CA} - Q_{CB}$. Thus, steps 1 through 6 do not affect $Q_A - Q_B$. In operation, the generation of the various control signals can be handled by microprocessor 90 in system 10 in FIG. 1, where it is understood that array will comprise differential pixels 70', according to the present invention.

Note that no assumption as to closeness of component matching was made in the above analysis, and the conclusions reached remain irrespective of the values of capacitors $C_A$, $C_B$, $C_{DA}$, and $C_{DB}$. Additionally the linearity of the capacitors does not affect performance, and the configuration shown in FIG. 6A will function with capacitors that are mismatched or even nonlinear.

Consider now the common mode voltage on photodiodes $D_A$ and $D_B$ after reset. Within reasonable bounds, the exact value of the common mode voltage is not critical. Although an analysis can be carried out for almost any capacitor values, for simplicity of explanation let it be assumed that $C_A = C_B$ and $C_{DA} = C_{DB}$.

Since it is small, let KT/C reset noise be ignored. Thus after step 5 if $V_{CA}$ (the voltage across capacitor $C_A$) and if $V_{CB}$ (the voltage across capacitor $C_B$) have the relation $V_{CA} = -V_{CB}$, the voltage on the top plate of $C_A$ is $(V_{ref}+V_{CA})$ and the voltage on the top plate of $C_B$ is $(V_{ref}-V_{CA})$.

As noted, charge difference $Q_A-Q_B$ is preserved in the configuration of FIG. 6A. Assuming that $C_A=C_A$ and $C_{DA}=C_{DB}$ it can be shown that the voltage difference $V_{DA}-V_{DB}$ on the photodiodes is also preserved, and that is voltage is $V_{DA}-V_{DB}=2V_{CA}=-2V_{CB}$, after step 5. Thus following step 5, $V_{DA}$ and $V_{DB}$ must differ from the top plate voltages on capacitors $C_A$ and $C_B$ by only a constant K.

$$V_{DA}=V_{ref}+V_{CA}+K \quad \text{eq. (7)}$$

$$V_{DB}=V_{ref}+V_{CB}+K=V_{ref}-V_{CA}+K \quad \text{eq. (8)}$$

$$V_{DA}+V_{DB}=V_{ref}+V_{CA}+K+V_{ref}-V_{CA}+K=2(V_{ref}+K) \quad \text{eq. (9)}$$

After step 6 because of charge redistribution the new voltages are:

$$V'_{DA} = [C_{DA} \cdot V_{DA} + C_A \cdot (V_{ref} + V_{CA})]/(C_{DA} + C_A) \quad \text{eq. (10)}$$
$$= [C_{DA} \cdot (V_{ref} + V_{CA} + K) + C_A \cdot (V_{ref} + V_{CA})]/(C_{DA} + C_A) \quad \text{eq. (11)}$$
$$= [(V_{ref} + V_{CA}) + C_{DA} \cdot K/(C_{DA} + C_A)], \text{ and} \quad \text{eq. (12)}$$
$$V'_{DB} = [C_{DB} \cdot V_{DB} + C_B \cdot (V_{ref} + V_{CB})]/(C_{DB} + C_B) \quad \text{eq. (13)}$$
$$= [C_{DB} \cdot (V_{ref} + V_{CB} + K) + C_B \cdot (V_{ref} + V_{CB})]/(C_{DB} + C_B) \quad \text{eq. (14)}$$
$$= [(V_{ref} + V_{CB}) + C_{DB} \cdot K/(C_{DB} + C_B)] \quad \text{eq. (15)}$$
$$= [(V_{ref} - V_{CA}) + C_{DA} \cdot K/(C_{DA} + C_A)] \quad \text{eq. (16)}$$

Thus the sum $V_{DA}'+V_{DB}'$ then becomes $$V_{DA}'+V_{DB}'=[(V_{ref}+V_{CA})+C_{DA}\cdot K/(C_{DA}+C_A)]+[(V_{ref}-V_{CA})+C_{DA}\cdot K/(C_{DA}+C_A)]=2\cdot[V_{ref}+K\cdot C_{DA}/(C_{DA}+C_A)] \quad \text{eq. (17)}$$

Thus the sum $V_{DA}'+V_{DB}'$ is advantageously always closer to $2V_{ref}$ than to $V_{DA}+V_{DB}$. This demonstrates that with each reset in FIG. 6A, the common mode is brought closer to $V_{ref}$ by $K\cdot[1-C_{DA}/(C_{DA}+C_A)]=K\cdot C_A/(C_{DA}+C_A)$.

Figure 6C:
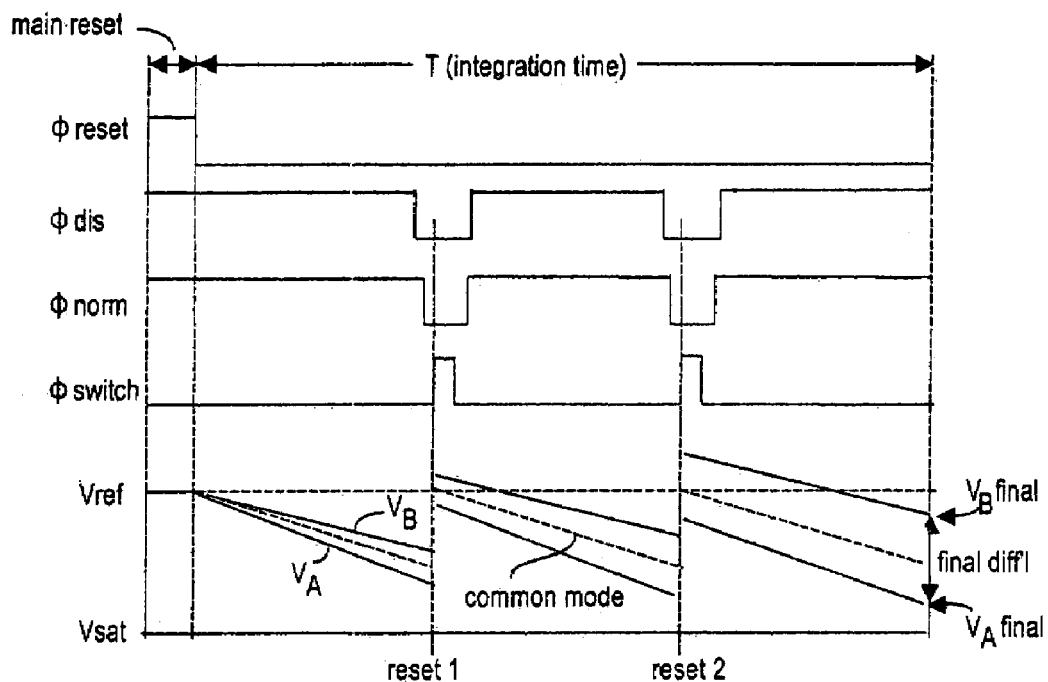
FIG. 6C depicts waveforms present in the detector of FIG. 6A over a two reset sequence, according to an embodiment of the present invention.

To recapitulate, for the embodiment of FIG. 6A, reset operation has the desired effect of centering the common mode about $V_{ref}$. Relevant waveforms for FIG. 6A are shown in FIG. 6C. As a consequence, a reset can be applied without consideration of over-saturating or under-saturating the common mode for the pixel configuration. Thus in normal operation, reset can occur as often as desired without concern as to ill effects resulting from over or under saturation of the common mode.

Transistors $T_{disA}$ and $T_{disB}$ can be used as global shutters, thereby improving resilience to ambient light by stopping the effects of all light impinging on the differential pixel when the shutter is turned off. When $T_{disA}$ and $T_{disB}$ are off, capacitors $C_a$ and $C_b$ are decoupled from photodetectors $PD_{DA}$ and $PD_{DB}$ and therefore stop integrating the signal from $PD_{DA}$ and $PD_{DB}$. If the output of the pixel is chosen to be top plate of capacitors $C_A$ and $C_B$ then the output of the pixel will be frozen after $T_{disA}$ and $T_{disB}$ are turned-off, thereby providing the function of a global shutter.

Figure 6D:
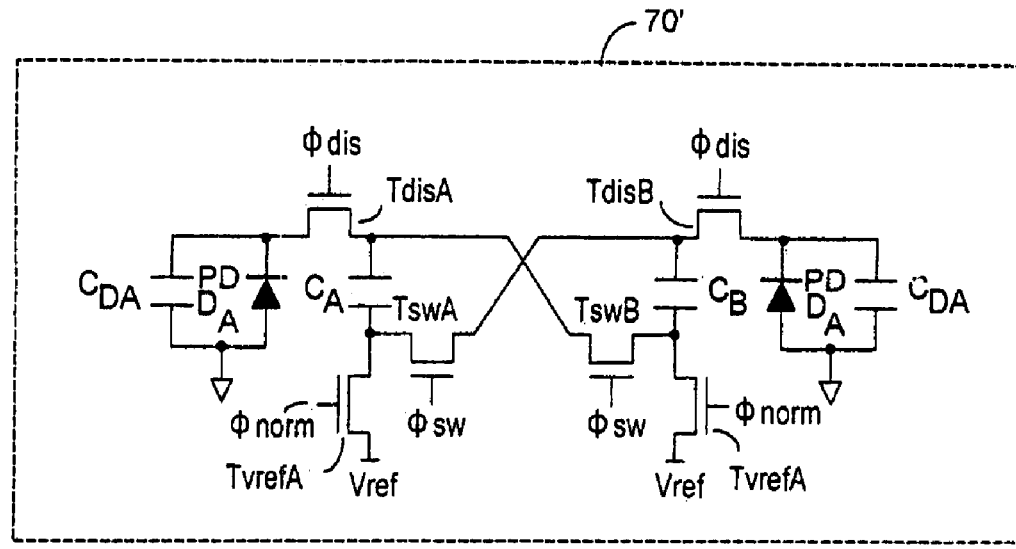
FIG. 6D depicts another configuration of a common mode resettable differential pixel detector, according to an embodiment of the present invention.

FIG. 6D depicts another embodiment of a capacitor common mode reset configuration for pixel 70', according to the present invention. Basic operation for the configuration of FIG. 6D is as described for the configuration of FIG. 6A. However, in FIG. 6D, initialization of voltages $V_{DA}$ and $V_{DB}$ across photodiodes $D_A$, $D_B$ respectively at the beginning of integration does not involve transistors $T_{resetA}$ and $T_{resetB}$ as was the case for the configuration of FIG. 6A. Instead, in FIG. 6D, reset is achieved by simultaneously turning-on transistors $T_{disA}$ and $T_{disB}$ with high control signals $\Phi_{dis}$, turning-on transistors $T_{swA}$ and $T_{swB}$ with high control signal $\Phi_{sw}$, and by turning-off transistors $T_{VrefA}$ and $T_{VrefB}$ with low control signal $\Phi_{norm}$. This has the effect of resetting photodetectors $PDD_A$ and $PDD_B$ to $V_{ref}$. Note that transistors $T_{disA}$ and $T_{disB}$ may be used as global shutters in this configuration.

Figure 6E:
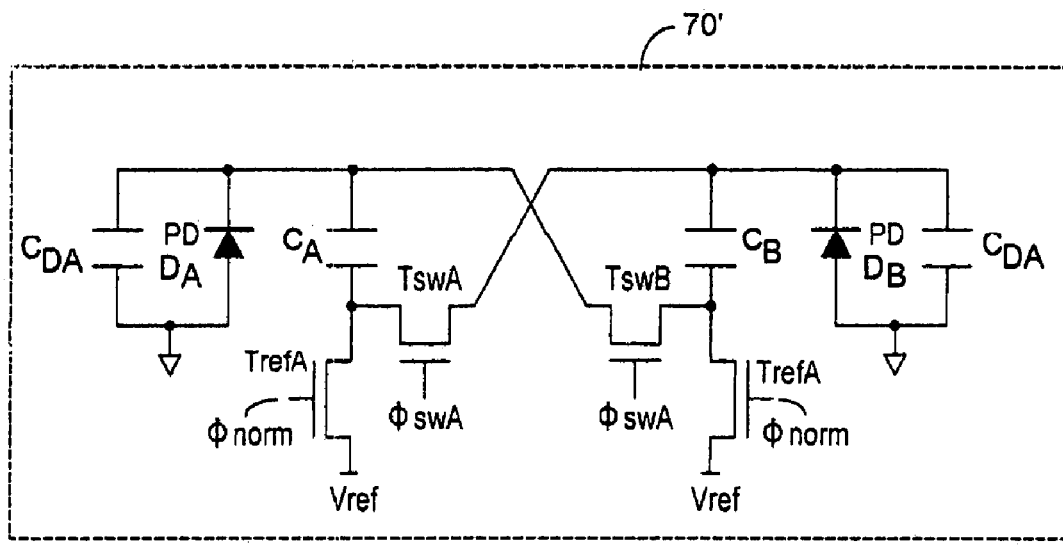
FIG. 6E depicts yet another configuration of a common mode resettable differential pixel detector, according to an embodiment of the present invention.

FIG. 6E depicts yet another embodiment for pixel 70', wherein discharge transistors $T_{disA}$ and $T_{disB}$ are eliminated. Indeed these discharge transistors could also be removed from the configurations of FIG. 6A and FIG. 6D. While these alternative configurations reduced common mode, unfortunately detector performance is diminished. This degradation results as each reset reduces some of the differential mode signal, and after a usually small number of resets, the differential signal is lost as a function of $C_{DA}/C_A$ and $C_{DB}/C_B$. Such embodiments may still find use in applications that do not require high precision, or where the number of resets is low, or where $C_{DA}<<C_A$ and $C_{DB}<<C_B$.

Figure 7A:
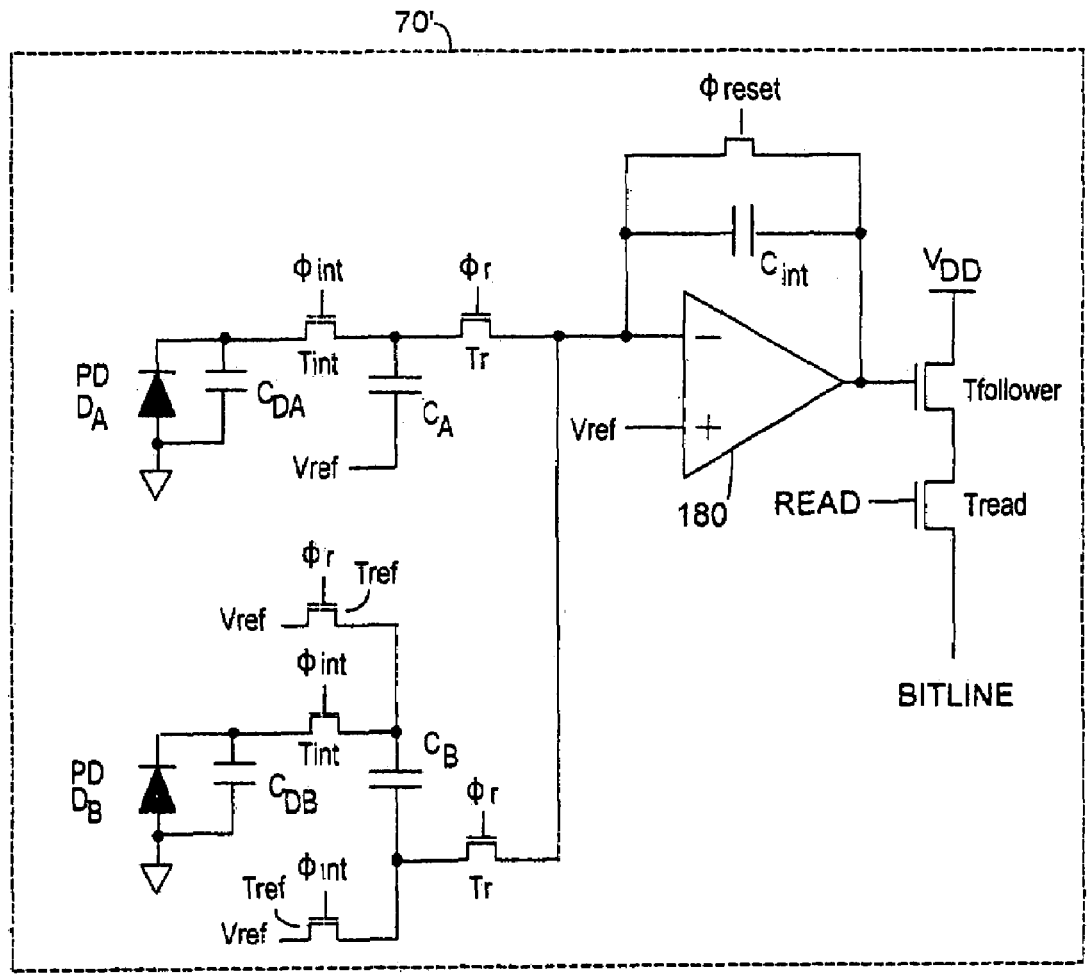
FIG. 7A depicts a common mode resettable differential pixel detector using charge integration, according to an embodiment of the present invention.
Figure 7B:
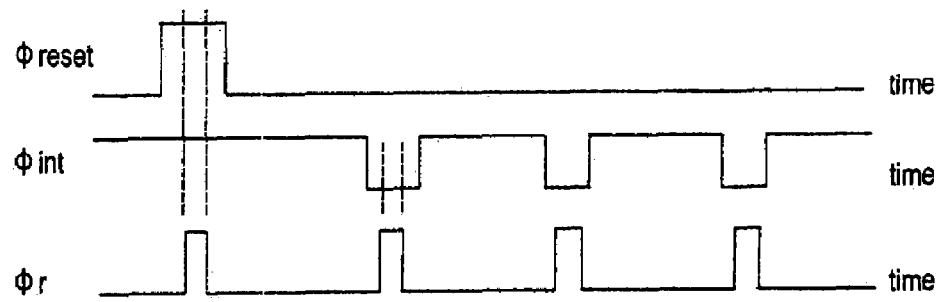
FIG. 7B depicts control waveforms for the embodiment of FIG. 7A, according to the present invention.

Turning now to FIGS. 7A and 7B, a configuration and waveforms for a differential pixel detector 70' is shown in which a charge integrator is used for differential signal integration and common mode reset. Integration is carried out by integrator 180 and integration capacitor $C_{int}$. During an initial frame reset, transistors controlled by $\Phi_{reset}$, $\Phi_r$, and $\Phi_{int}$ signals are all turned-on, and the voltages on photodetectors $D_A$ and $D_B$ are reset to $V_{ref}$.

During integration, transistors controlled by signal $\Phi_{int}$ are turned-on and transistors controlled by signals $\Phi_r$, $\Phi_{reset}$ are turned-off. Thus during integration, light induced photocurrent discharges photodiode parasitic capacitance $C_{DA}$, $C_{DB}$, as well as capacitors $C_A$ and $C_B$. As has been noted, the integrated signals contain both differential mode and common mode components. FIG. 7B depicts various control voltage waveforms used in the embodiment of FIG. 7A.

Next, in a common mode reset phase, control signal $\Phi_{int}$ goes low, causing transistors $T_{int}$ to decouple $C_A$ from $C_{DA}$ and to decouple $C_B$ from $C_{DB}$. Then control signal $\Phi_r$ goes high, turning-on transistors $T_r$ and charge in both $C_A$ and $C_B$ transfers to the integration capacitor $C_{int}$. Note that polarities of the charge transferred onto $C_{int}$ are opposite due to the arrangement of the $T_r$ switches.

The integrated charge on $C_{int}$ after the common mode reset can be expressed in terms of charge on $C_{DA}$, $C_{DB}$ before the common mode reset as:

$$Q_{int}=Q_{C_{DA}}-Q_{C_{DB}} \quad \text{eq. (18)}$$

Therefore the common mode signal is cancelled while the differential signal is preserved, which is the desired result.

Preferably common mode reset is performed multiple times and is interleaved with the integration during the whole frame integration. During integration, the integrating operational amplifier 180 may be turned off to save power. The total number of common mode reset performed will depend on the intensity of ambient light. The final signal readout is the accumulated charge (hence voltage) on $C_{int}$.

While the charge integrator in the embodiment of FIG. 7A used a single-ended operational amplifier 180, a fully differential operational amplifier could be used, among other types of integration configurations.

In the embodiment of FIG. 7A, each differential pixel (e.g., each $D_A$ and $D_B$ photodiode pair) has its own integrator, e.g., 180. In an alternative embodiment, one can implement only integration capacitor $C_{int}$ within each pixel, and share operational amplifier 180 as well as switches associated with connecting $C_{int}$ to amplifier 180 among multiple pixels. This approach would require fewer transistors per pixel, allowing a higher fill factor to be achieved on the integrated circuit containing the detector system.

Figure 8A:
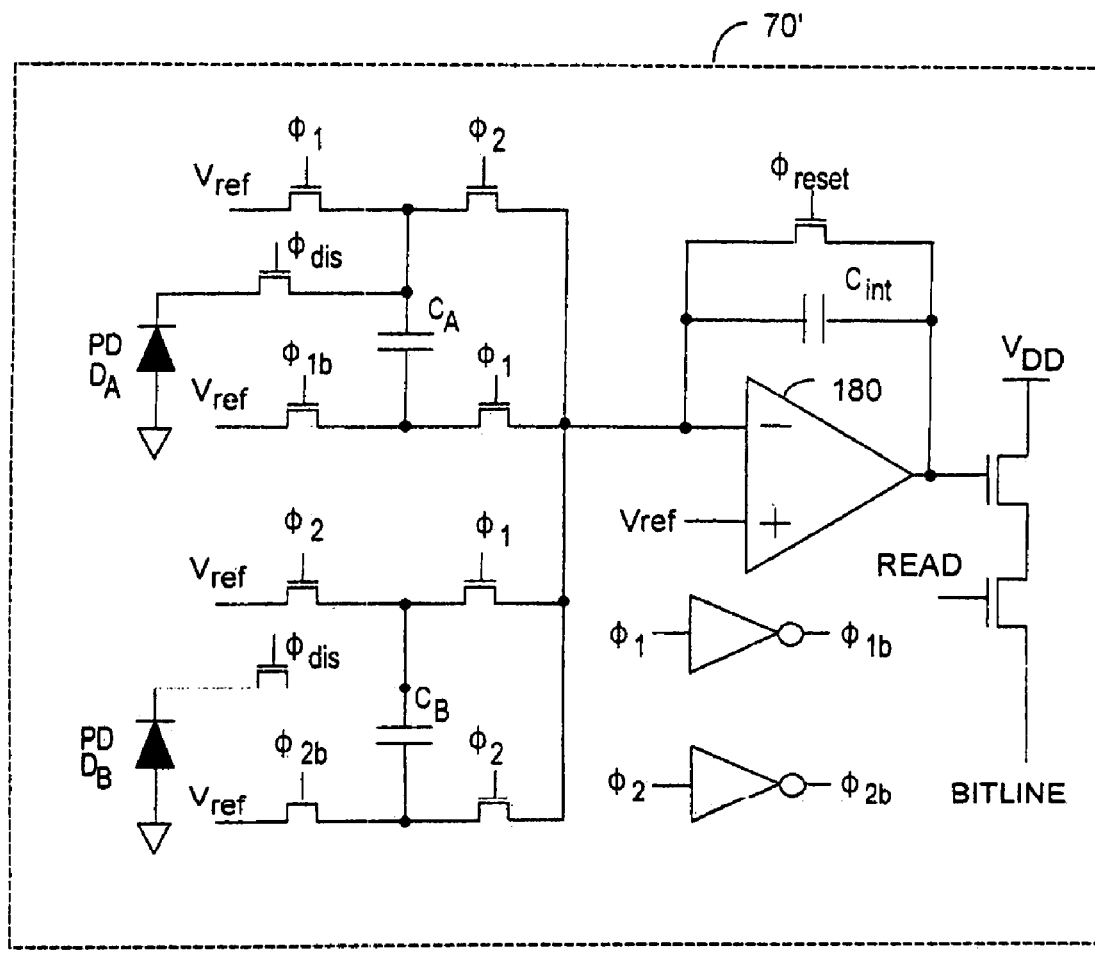
FIG. 8A depicts a common mode resettable differential pixel detector with component mismatch cancellation using charge integration, according to an embodiment of the present invention.

Turning now to FIG. 8A, an embodiment of a differential detector 170' is shown in which the common mode reset circuitry compensates for potential mismatch between components such as mismatched detector area between $D_A$ and $D_B$, mismatched tolerance between capacitors $C_A$ and $C_B$, as well as mismatched transistor sizes.

Figure 8B:
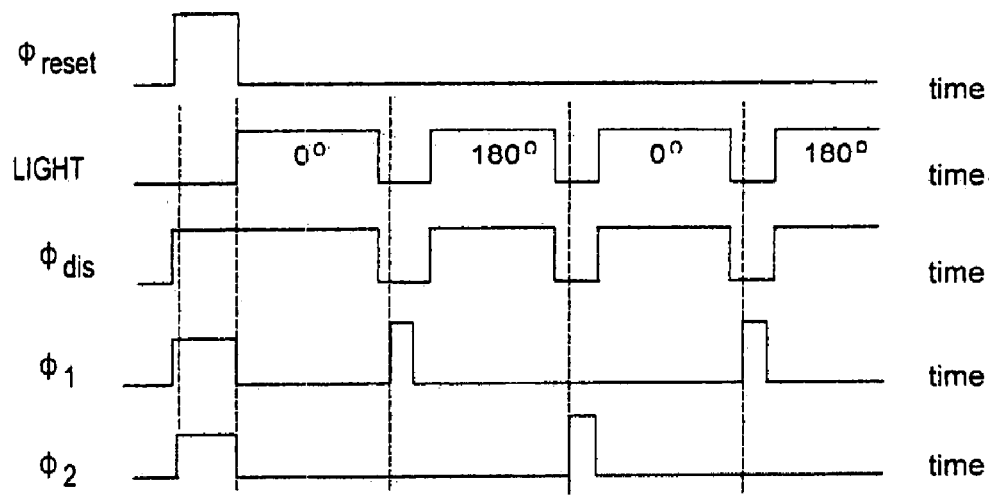
FIG. 8B depicts waveforms associated with the configuration of FIG. 8A, according to an embodiment of the present invention.

FIG. 8B depicts control waveforms found in an alternate embodiment of FIG. 8A. In this alternate embodiment, as shown in FIG. 8B, the phase of the optical energy waveform from emitter 40 (LIGHT) alternates between 0° and 180° with respect to the phase of a signal used to modulate the photo-detectors. Thus, rather than use fixed charge transfer polarity as in the embodiment of FIG. 7B, polarity between $D_A$ and $D_B$ is switched synchronously in time with modulation of the light emitted from system 10 towards target object 20. The accumulated charge on integration capacitor $C_{int}$ at the end of frame integration is expressed as:

$$Q_{int} = (Q^1_{A,0} - Q^1_{B,0}) + (Q^1_{A,180} - Q^1_{B,180}) + (Q^2_{A,0} - Q^2_{B,0}) + \quad \text{eq. (19)}$$
$$(Q^2_{A,180} - Q^2_{B,180}) + \ldots$$
$$= \sum_{i=1}^{n/2} (Q^i_{A,0} - Q^i_{B,0}) + \sum_{i=1}^{n/2} (Q^i_{A,180} - Q^i_{B,180})$$

where $Q_{A,0}$ represents the charge collected by detector $D_A$ with respect to 0° light phase, $Q_{B,0}$ represents the charge collected by detector $D_B$ with respect to 0° light phase, $Q_{A,180}$ represents the charge collected by detector $D_A$ with respect to 180° light phase, and $Q_{B,180}$ represents the charge collected by detector $D_B$ with respect to 180° light phase. As is apparent from the above equation, if the total number of common mode resets is n, then half of the final differential charge is collected from detector $D_A$ and half of the charge is collected from detector $D_B$. Another advantage of this embodiment is that KT/C noise associated with the transistor switches becomes common mode; therefore such noise is cancelled out from the final differential signal value.

Figure 9A:
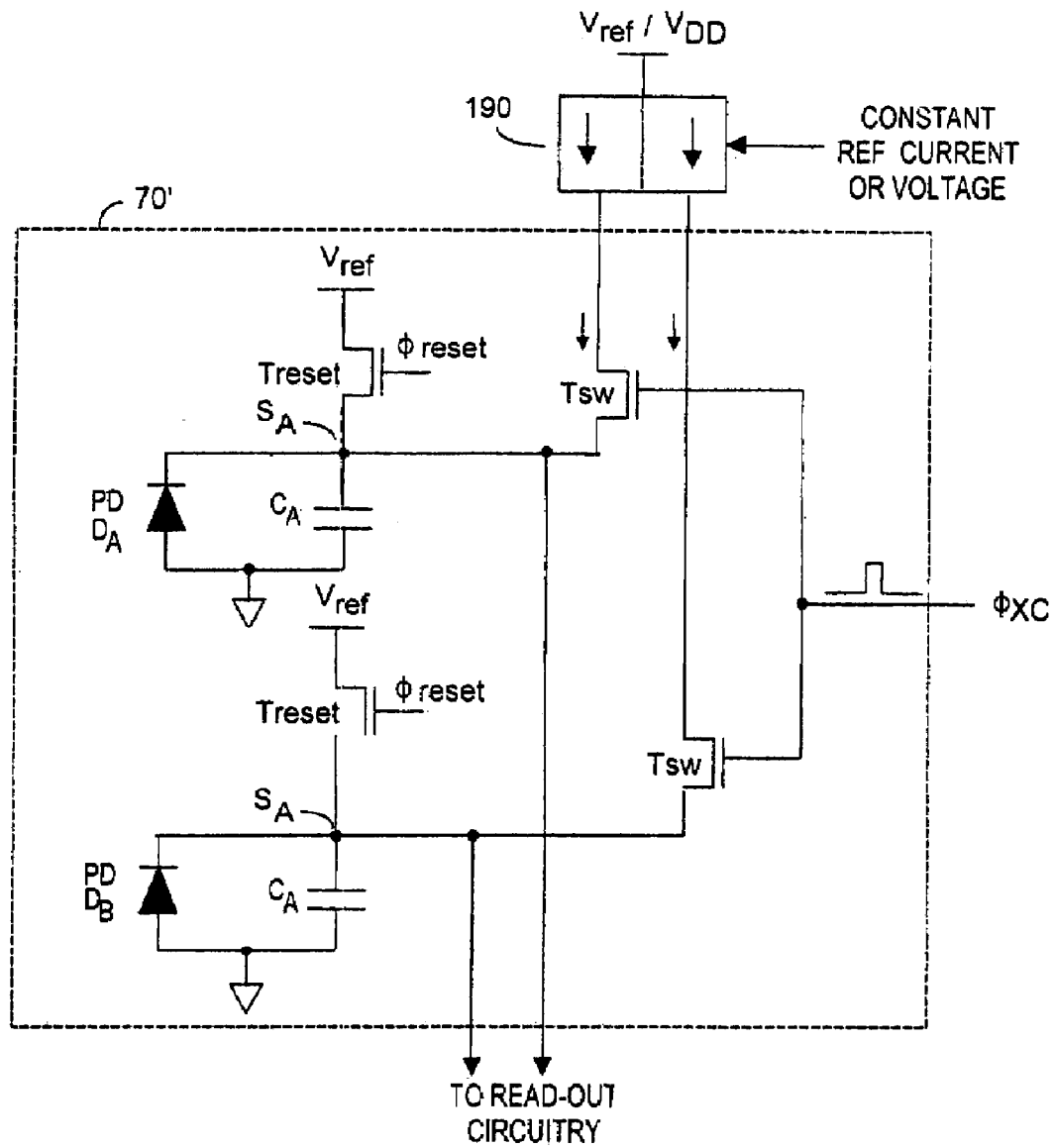
FIG. 9A depicts a resettable differential pixel detector implemented with VCCS/CCCS current mirror, and an external control signal, according to an embodiment of the present invention.

Most of the above-described embodiments accumulate the $D_A$-$D_B$ charge difference in a capacitor, and periodically reset $D_A$ and $D_B$ to $V_{ref}$ to avoid saturation. FIG. 9A depicts an alternative approach in which potentials $V_a$ and $V_b$ are increased by a fixed amount $\Delta V$ before these potentials drop below a certain level due to high-common mode light. This approach is somewhat analogous to the capacitor common mode reset embodiments that have been described. However the embodiment of FIG. 9A uses a separate circuit with an external current source 190.

In the embodiment of FIG. 9A, a periodic injection of a fixed amount of charge into detectors $D_A$ and $D_B$ occurs. The result is that while the differential ($D_A$-$D_B$) charge does not change, the common mode of $D_A$ and $D_B$ is refreshed (i.e., decreased) to prevent photodetector saturation. An external current source 190 is required, which current source may be a reference Voltage Controlled Current Source (VCCS) or perhaps a reference Constant Current Controlled Current source (CCCS), in which case the current source becomes a current mirror.

Figure 9B:
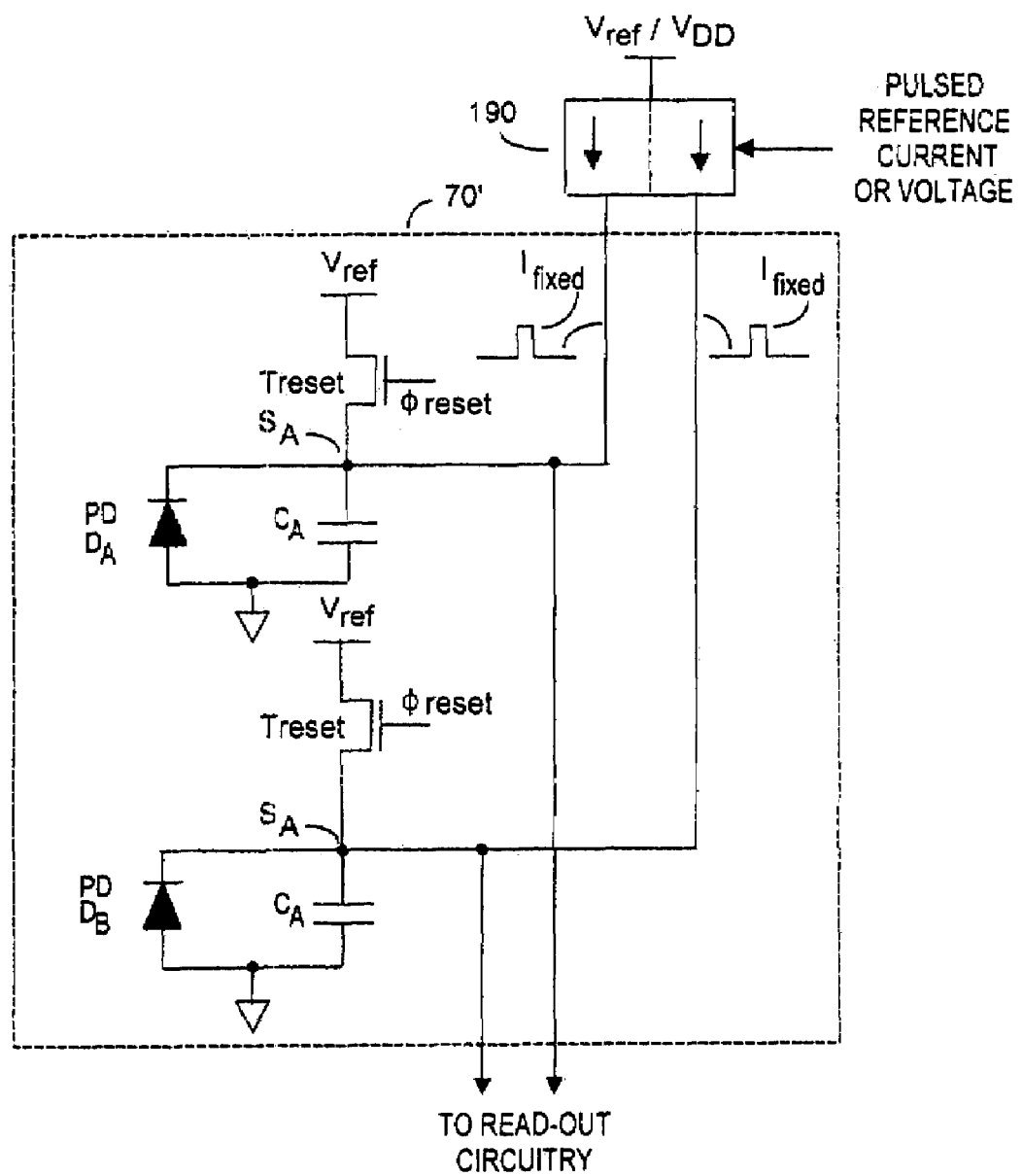
FIG. 9B depicts a resettable differential pixel detector implemented with VCCS/CCCS current mirror, and a pulsed reference input signal, according to an embodiment of the present invention.

The embodiment of FIG. 9A and the embodiment of FIG. 9B demonstrate two approaches to periodically refreshing charge into detectors $D_A$ and $D_B$. In FIG. 9A, current source 190 is always on, but switches Tsw responsive to an external signal $\Phi_{XC}$ are used to couple the constant current output by source 190 to nodes $S_A$ and $S_B$. During integration $\Phi_{XC}$ is periodically turned-on for a brief period of time to charge-up nodes $S_A$ and $S_B$, hundreds of nanoseconds perhaps.

In the embodiment of FIG. 9B, switches $T_{sw}$ are eliminated and instead the input current or voltage to current source 190 is itself pulsed. In essence rather than import a signal $\Phi_{XC}$, $\Phi_{XC}$ pulses are imported into current source 190 and result in current pulses of constant amplitude as shown.

Figure 9C:
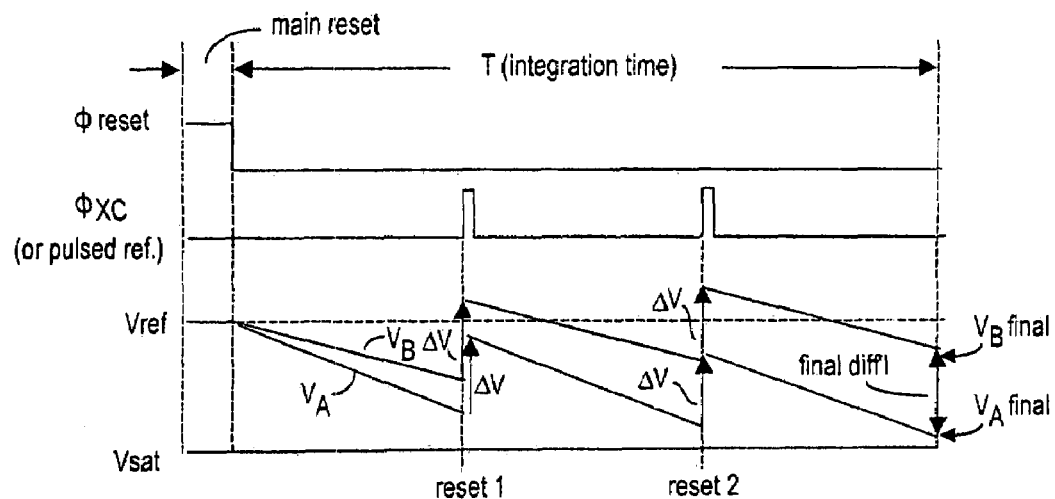
FIG. 9C depicts waveforms found in a current-source implemented differential pixel detector over a two reset sequence, according to an embodiment of the present invention.

FIG. 9C depicts waveforms for the configurations of FIGS. 9A and 9B. Note that advantageously the final differential voltage is simply ($V_A$-$V_B$) and that no other computation need be done. The rate at which $\Phi_{XC}$ or the reference input to current count 190 will depend upon the common mode ambient light. A higher rate would be called for in the presence of very strong ambient light to keep source nodes $S_A$ and $S_B$ from saturating.

Figures 9D, 9E:
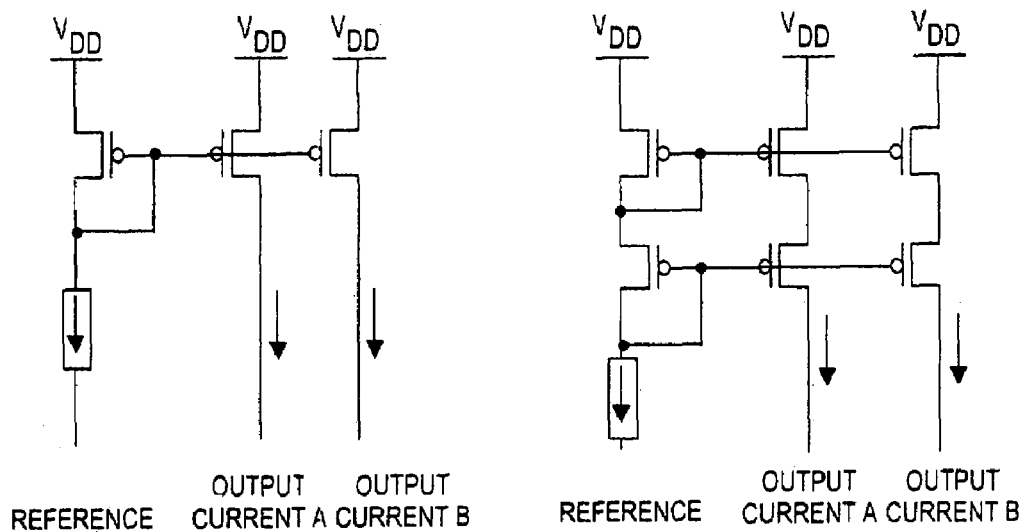
FIG. 9D and FIG. 9E depicts two implementations of a CCCS current mirror for use in a differential pixel detector, according to an embodiment of the present invention.

As noted, current source 190 may be controlled using a voltage reference or a current reference. If a voltage reference is used, the voltage can be $V_{DD}$ or $V_{ref}$, in which case only the $\Phi_{XC}$ signal would be needed to perform common-mode removal. For CCCS (or current mirrors) a variety of circuit configurations are structures are available, two of which are shown in FIGS. 9D and 9E. While the configuration of FIG. 9D has fewer components, its current output may suffer from nonlinearity caused by transistor channel length modulation. The configuration of FIG. 9E provides a cascoded current mirror that is insensitive to voltage at the current output nodes. The choice of current source configuration involves a tradeoff between circuit complexity and accuracy.

An important concern in implementing current mirrors is matching, in this case between output currents A and B. To minimize matching errors, transistors with large values of width and length should be used and should be carefully laid out. For example the orientation of transistors should be the same for currents A and B.

Figure 10A:
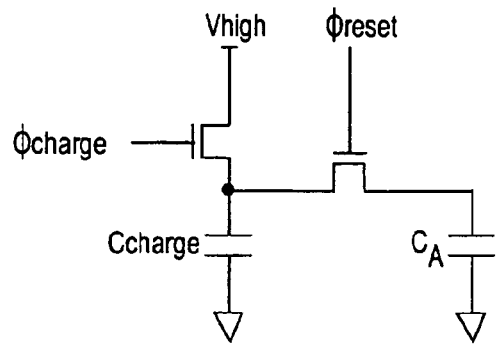
FIG. 10A depicts a configuration for resetting common mode using a shunt capacitor, useable with a resettable differential pixel detector according to an embodiment of the present invention.
Figure 10B:
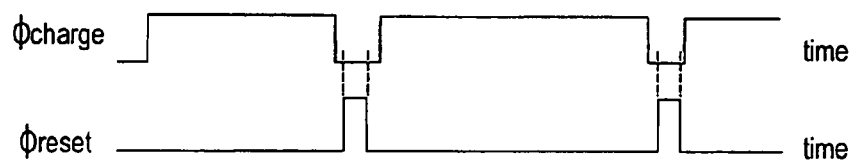
FIG. 10B depicts control waveforms found in the configuration of FIG. 10A, according to an embodiment of the present invention.

FIG. 10A depicts a shunt capacitor embodiment of the present invention to periodically inject a certain amount of charge into photodetector $D_A$ and $D_B$ to compensate for the common mode. FIG. 10A depicts one-half of such a circuit, while FIG. 10B depicts control signal waveforms. A, preferably, very small capacitor $C_{charge}$ is initially charged-up to a relatively high voltage. When charge signal $\Phi_{charge}$ goes low and reset signal $\Phi_{reset}$ goes high, $C_{charge}$ and $C_A$ are connected, and most of the charge will be transferred to $C_A$ since its capacitance is much higher than $C_{charge}$. Since the same amount of charge is added into both halves of the configuration, the common mode signal is reset while the differential mode signal is preserved.

Embodiments of the present invention will now be described, commencing with FIG. 11. FIG. 11 depicts an embodiment of a differential pixel detector 70' and associated shutter and readout switch transistors, which collectively may be denoted as dedicated electronics 80'. Both halves of the full differential pixel detector are shown and it is understood that pixel detector 70' is preferably one of many detectors in an array 60, such as shown in FIG. 1 and FIG. 13. Sensors in many applications including security systems and motor vehicles may require correct frame capture of image areas of a target 20 (see FIG. 1 and FIG. 13) in direct ambient sunlight as well as in relatively dimly lit environments. The requirement that sensors operate properly over such gross variations in ambient light can dictate that sensors, including sensors such as 70', must exhibit a high dynamic range, perhaps at least 100 dB. It is noted that timing waveforms shown in FIG. 6B are applicable to common mode reset operation of the embodiment of FIG. 11 (as well as FIG. 12).

New generations of CMOS sensors such as SmallCam, Pixim, can permit sensor operation at such high dynamic range levels. For use in CMOS image sensing, ambient light is usually the parameter to be measured, and for which a high dynamic sensor range is needed. But for three-dimensional sensing using time-of-flight and a modulated light source (e.g., source 40 in FIG. 1 and FIG. 13), strong ambient light is unwanted and must be substantially reduced if not eliminated rather than measured.

As described earlier herein with respect to the parent invention, the effects of ambient light can be substantially reduced electronically such that even a time-of-flight sensor system can operate properly in ambient sunlight. One such technique is common mode reset, such as was described with respect to FIGS. 3A-10B herein. Common mode reset is useful in combating the effects of ambient light (a common mode parameter) as well as the effects of dark current (also a common mode parameter). Common mode reset can also mitigate the effects of low detection performance. In an ideal detector system, common mode reset would preserve all of the desired differential pixel detection signal values while resetting all of the common mode signal components to a fixed value. Ideally this performance would be realized with no noise uncertainty from KT/C noise resulting from capacitors, save for parasitic capacitances.

The shortcoming of a differential detector 70' with common mode reset circuitry will now be described with reference to FIG. 11 Incoming optical radiation (not shown) will develop a photodetector current within the differential pixel comprising detector 70'. Clock signals CLKA, CLKB, CLKC are generated from a clock driver system, preferably implemented on IC 30 and are coupled into detector 70'. It is understood that that other detector types using different clocking structures may be used, but in the exemplary implementation of FIG. 11, assume that three clock signals are used, CLKA, CLKB and CLKC. Further information as to clocking schemes may be found in U.S. Patent Application Publication No. 2003/0223053 A1 to Liu et al. and entitled METHOD AND DEVICES FOR CHARGE MANAGEMENT FOR THREE-DIMENSIONAL AND COLOR SENSING, the entire content of which application is incorporated herein by this reference. Capacitors $C_A$ and $C_B$ are charge storage capacitors and typically are about 60 fF. Switch transistors TrefA, TrefB, responsive to a $\Phi_{norm}$ signal, couple a known reference potential Vref to capacitor bottom nodes $R_A$ and $R_B$. Reset transistors TresA, TresB, couple or de-couple nodes $R_A$ and $R_B$ to capacitor upper nodes $O_A$ and $O_B$, respectively. Reset signals $\Phi_{sw}$ selectively close resets transistors TresetA and TresetB, which cause nodes $O_A$ and $R_B$ or nodes $O_B$ and $R_A$ to be connected to each other. Shutter transistors $T_{shutA}$ and $T_{shutB}$ are responsive to shutter signals $\Phi_{ds}$ that when active couple the respective "A" and "B" outputs from differential detector 70' to nodes $O_A$ and $O_B$. Transistors $T_{fA}$ and $T_{fB}$ are source followers that deliver the detector "A" or detector "B" portions of differential detector 70' signals to BITLINE A or BITLINE B via read transistors $T_{rA}$ and $T_{rB}$. As noted, in FIG. 11 and FIG. 12, components other than differential detector 70' may be collectively designated as dedicated per-pixel detector electronics 80', which electronics preferably is implemented on IC chip 30' (see FIG. 13).

Those skilled in the art will recognize that associated with nodes OA, OB, RA, and RB will be parasitic capacitance, not shown in FIG. 11. One undesired effect of parasitic capacitance at these nodes is that instead of providing 100% of the differential detector signal to BITLINE A and BITLINE B, in practice only about 97% of the differential detector signal is preserved after each common mode reset operation. As a result, after multiple common mode resets, a relatively smaller fraction of the differential signal is available. For example, after about thirty common mode resets, only about 40% of the differential signal will remain. This results follows from $(0.97)^{30}$. Although the final signal/noise ratio is better than if only 40% of the incoming optical energy could be detected and collected, the 3% signal loss nonetheless degrades the overall signal/noise ratio. The parasitic capacitance of the detector results in elimination of only about 70% of the common mode signal (e.g., ambient light component). This degradation in common mode rejection occurs because of undesired charge sharing between the integration capacitors $C_A$ and $C_B$ and the parasitic capacitance associated with detector 70' and is not remedied by the present invention. What occurs is that when shutter transistors $T_{shutA}$, $T_{shutB}$ open during common mode reset, some charge is left in the detector capacitance and for this residual charge, common mode is not eliminated. This in turn requires more common mode reset cycles than would otherwise be necessary, which additional reset cycles result in further loss of the desired differential detector signal. Further the presence of residual common mode signal means that detector 70' operates at a lower magnitude voltage within its dynamic range than would otherwise be the case. The configuration of FIG. 11 will introduce KT/C noise but only for the parasitic capacitances on nodes $O_A$, $O_B$, $R_A$, $R_B$. However since the parasitic capacitances are small (perhaps on the order of 1 fF), the KT/C noise is small and is generally less than the shot noise of the detector.

Figure 12:
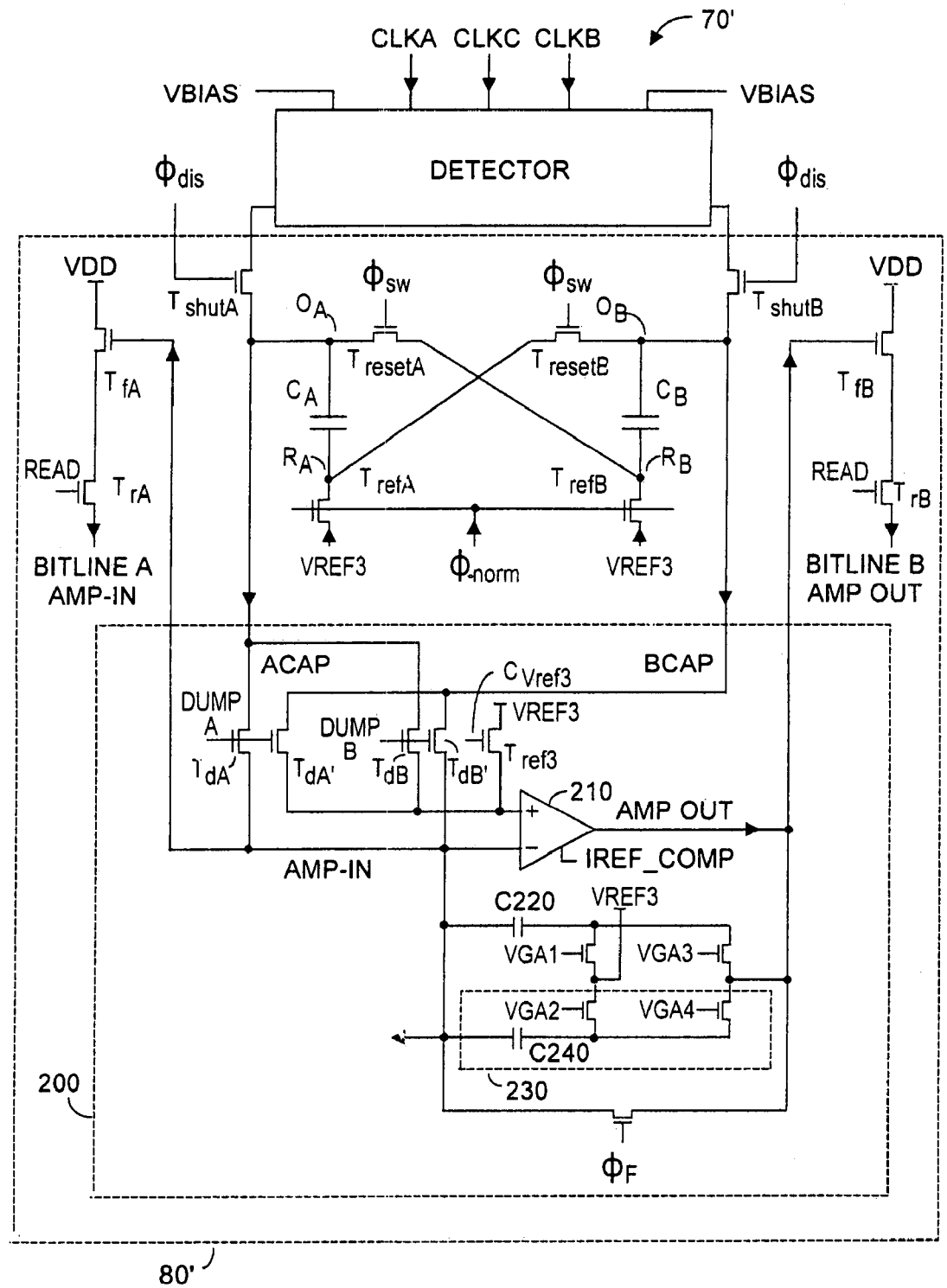
FIG. 12 depicts an embodiment of a differential common mode resettable sensor and associated switching transistors with enhanced performance, according to the present invention.
Figure 13:
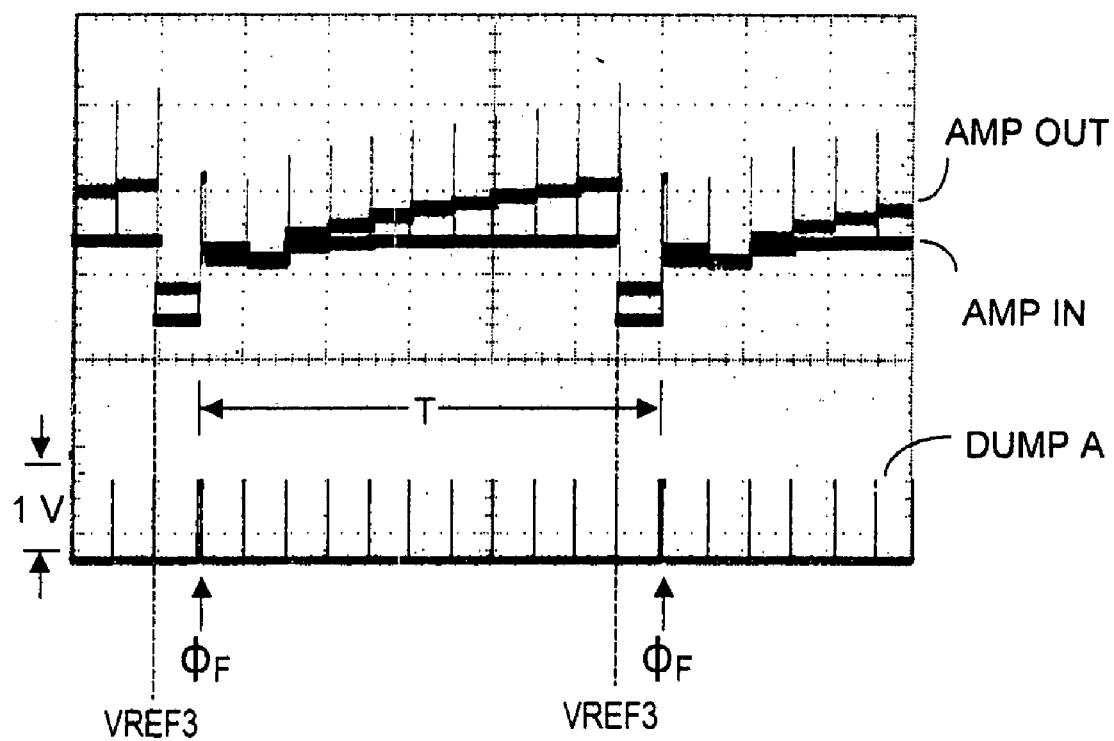
FIG. 13 depicts oscilloscope traces representing various waveforms for the embodiment of FIG. 12, according to the present invention.

FIG. 12 presents an improved configuration that addresses the differential loss noted for the embodiment of FIG. 11 but enjoys the same relatively low KT/C noise characteristics despite the presence of additional circuitry. In FIG. 12, the performance of the common mode reset circuitry is improved by the addition of an operational amplifier, as will now be described. In FIG. 12, additional common mode reset circuitry 200 is provided, in which operational amplifier 210 functions to remove differential detector signal charge from nodes $O_A$, $O_B$ and to store the removed charge in an integration capacitor. With this functionality, the embodiment of FIG. 12 preserves the stored removed charge without substantial loss due to subsequent common mode reset cycles. In practice, at least a substantial fraction (e.g., $\geqq$50%) of the stored charge is removed for isolated storage on each so-called dump cycle. It will be appreciated that the system could function with less than 50% stored charge removal per cycle, however overall more differential charge will be lost during common mode reset operations. The result from saving at least a substantial fraction of the differential charge is improved dynamic range, improved retention of the desired differential detector signal, and improved common mode rejection. Components shown in FIG. 12 other than differential detector 70' may be designated as electronics 80', preferably dedicated to each pixel detector 70, and CMOS-implemented on the common IC 30'.

As noted, during an integration period T operation of the present invention exemplified in FIG. 12 involves a number n of common mode reset operations, and a number x of dumps (transfers-out) of the differential charge from capacitors $C_A$, $C_B$ associated with each differential pixel detector into an active integration capacitor C220. It is understood that more than one integration capacitor may in fact be used. Once dumped, the differential charge is stored in capacitor C220 and is not affected by subsequent common mode resets. The number of dumps x may be less than or equal to or even greater than n. However in a preferred mode of operation, there will be a dump or transfer-out of differential charge before a common mode reset.

During common mode reset operation, the differential detector signal charge is first read transferred into the integration capacitor C229 by turning-on dump transistors $T_{dA}$, $T_{dA}'$, which dumps charge from capacitor $C_A$ node OA and from capacitor $C_B$ node OB respectively into the non-inverting and inverting inputs of operational amplifier 210. Shutter transistors TshutA and TshutB remain open, which allows even the differential detector charge to be transferred. Subsequent common mode resets will have no effect on this safely stored-away differential detector and capacitor $C_A$ and $C_B$ charge. As noted, the number of dumps x may be less than, equal to, or greater than the number of common mode resets n that occur within an integration period T.

Next, shutter transistors $T_{shutA}$ and $T_{shutB}$ and dump transistors $T_{dA}$, $T_{dA}'$ are opened, and common mode reset is performed.

Successful operation of the embodiment of FIG. 12 results in substantially improved preservation of differential detector signal charge, perhaps has much as 99.5% retention as contrasted with about 97% retention for the configuration of FIG. 11. Furthermore, such charge loss as occurs (e.g., perhaps about 0.5% charge loss) will be substantially independent of the number n of common mode rejection cycles. The KT/C noise characteristics and removal of common mode by common mode reset for the embodiment of FIG. 12 will be similar to that of the configuration of FIG. 11.

The differential nature of operational amplifier 210 provides a single-ended output signal (AMP OUT) that could be used to directly drive a bitline (BITLINE B) without use of a source follower such as $T_{fB}$ in FIG. 12. Nonlinear effects of the source follower for bitline A are small because the voltage magnitude will be close to $V_{ref3}$. Also depending upon how bitline readout is implemented, BITLINE A may be coupled directly to $V_{ref3}$ instead of via a source follower for reasons of simplicity. Inclusion of a source follower introduces nonlinear effects, especially in the presence of a large differential signal when source followers $T_{fA}$ and $T_{fB}$ would be operating at different gate input voltages. However in practice, considerations of operational amplifier size, operating power and stability may dictate the inclusion of source followers, as shown in FIG. 12.

As noted, the total differential detection charge from differential detector 70' is accumulated in integration capacitor C220, whose value is perhaps 40 fF. At the end of an integration period, the total accumulated charge may be read-out in several ways. Referring to FIG. 12, components in sub-system 230 are optional. However these components allow closed-loop gain of operational amplifier 210 to be varied by adding C240 to increase effective integration capacitance. Integration capacitance can be increased by judiciously enabling transistor switches in the feedback loop via control signals VGA1, VGA2, VGA3 and VGA4. This flexibility can advantageously vary amplifier 210 closed loop gain, and can be used to improve distance measurement resolution δZ, while still avoiding amplifier saturation.

When the READ signal to the gate of transistor $T_{rA}$ is high (for the configuration shown), the signal present at the inverting input of operational amplifier 210 will be read-out to BITLINE A. Preferably simultaneously, the READ signal also turns-on transistor $T_{rB}$ such that BITLINE B reads-out the AMP OUT signal. What results is a differential signal across BITLINE A and BITLINE B that represents the correct voltage value stored on integration capacitor C220.

An alternate read-out method will now be described. Consider now the signal at the non-inverting input of operational amplifier 210. A high signal $C_{Vref3}$ turns-on transistor $T_{ref3}$, which couples a known reference voltage $V_{REF3}$ to the non-inverting input of operational amplifier 210. As a result, a high READ signal to transistor $T_{rB}$ reads-out the signal on BITLINE B. If necessary, BITLINE A may be read-out simultaneously to reduce the effects of noise on $V_{REF3}$. The result is achieved by creating a differential value at the input of operational amplifier 210, wherein one of the differential values is $V_{REF3}$.

It will be appreciated that some mismatch may exist between the values of storage capacitors $C_A$, $C_B$ as well as between node parasitic capacitance, which mismatches can affect the final signal value of the first-described read-out method. It is understood that there will be parasitic capacitance at the non-inverting input of operational amplifier 210. Relative to a capacitor reset value of $V_{ref}$ the AMP. The charge (with respect to a capacitor reset value of Vref) on this parasitic capacitance is substantially eliminated when the node is coupled to $V_{ref3}$. This is what occurs in the second read-out method, but unfortunately a charge error is created whenever the initial amplifier input was not precisely $V_{ref3}$. However effects of mismatch using the first read-out method and effects of charge error using the second read-out method can both be reduced by first bringing the voltage levels at both operational amplifier 210 inputs substantially to the initial reset value. The desired result can be accomplished by performing a series of common mode reset and charge dump operations before beginning the read-out sequence.

Alternately by reading a single ended value from Bitline A (let SBA denote the value) the error resulting for mismatch between Vref and voltages on the inputs to operational amplifier 210 can be mathematically compensated for. This is because for both read-out methods, there is a mathematical formula between the error and SBA. This mathematical formula is a function of SBA and integration capacitor C220, and either the capacitance mismatches (for the first read-out method) or the non-inverting operational amplifier positive terminal capacitance (for the second read-out method) read method 2). Note that for the second read-out method the value SBA must be read-out before $V_{ref3}$ is connected.

Note that a combination of both read-out methods can be used. First the voltage on the two operational amplifier inputs is brought close to the reset voltage $V_{ref3}$. Then SBA is read-out using either read-out method, and the remaining error is mathematically calibrated out. Note that for reasons of economy of implementation, it is preferable to acquire SBA with relatively low accuracy. Thus in practice, SBA is read-out before the voltage on the operational amplifier inputs is brought close to reference voltage $V_{ref3}$ via repeated common mode reset dump operations. Before this series of common mode reset dump operations, magnitude of SBA relative to the reset voltage $V_{ref3}$ will be fairly large, perhaps in the tens or hundreds of mV range. But after the series of common mode reset dump operations, this residual SBA voltage will be on the order of perhaps a few mV. Furthermore, this residual voltage will be a known fraction of the original SBA voltage before the series of common mode dump operations. Because this fraction is known a priori, by quantizing the larger quantity (magnitude of SBA before the reset operations), the smaller quantity (magnitude of SBA after the reset operations) can be known more accurately. The fraction can be determined empirically, or can be modeled taking into account relative values of $C_A$, $C_B$, and parasitic capacitance present at the non-inverting input of operational amplifier 210.

Figure 2A:
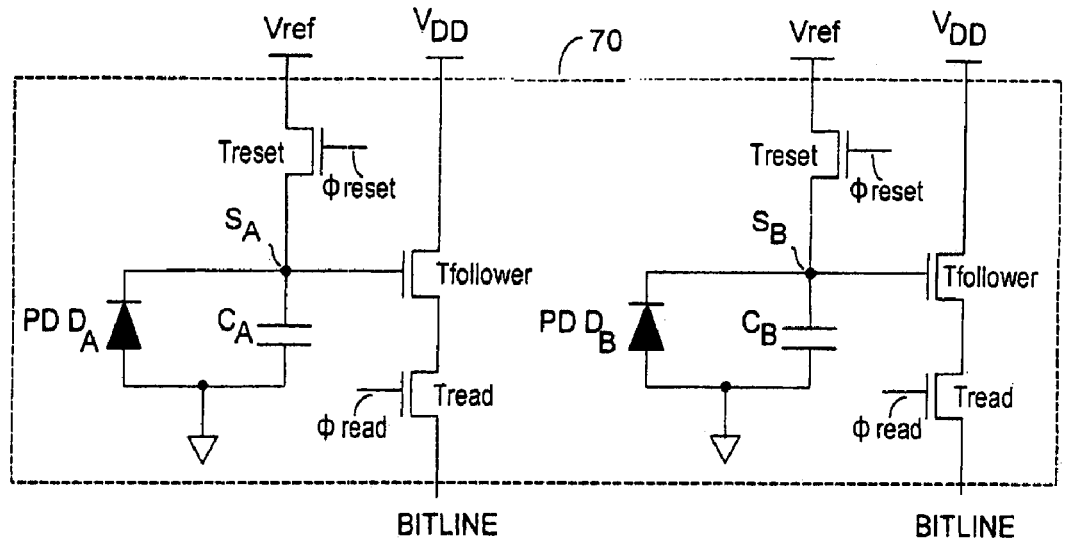
FIG. 2A depicts a conventional differential pixel detector.
Figure 2B:
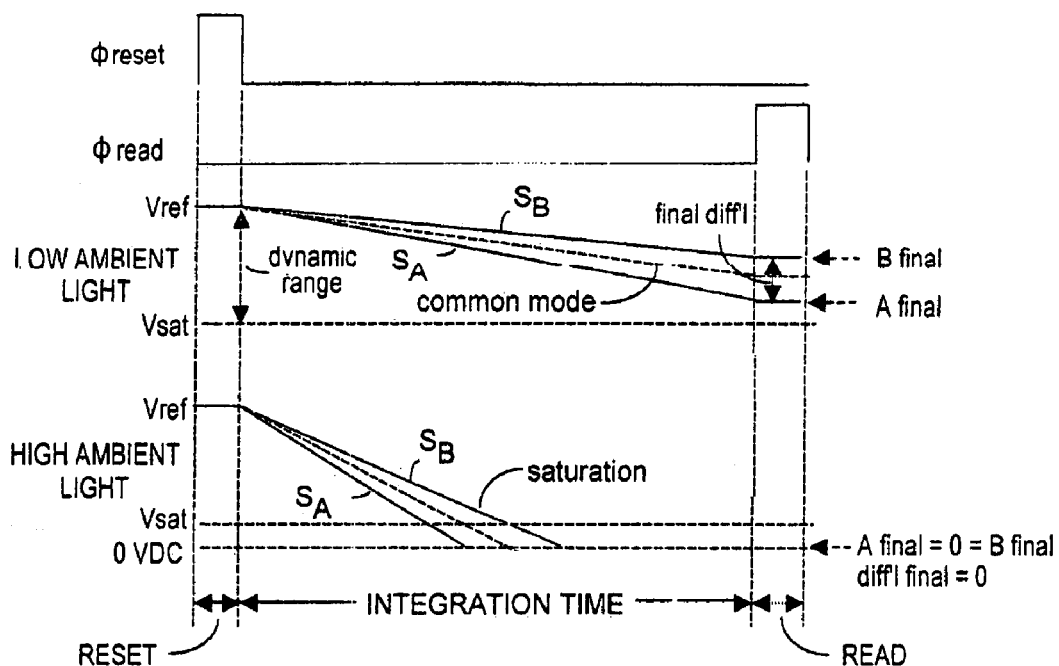
FIG. 2B depicts waveforms present in the detector of FIG. 2A showing the saturation effects of high ambient light.

Note too that the addition of transistor switches connected to the DUMP B signal allows the differential detector system shown in FIG. 12 to function symmetrically with respect to "A" and "B" detector components. As a result, at some times the "A" and "B" components of differential detector 70' will be coupled to the non-inverting input and inverting inputs, respectively, of operational amplifier 210, and at other times the capacitor couplings will be reversed. Within an integration period T, there may be several integration time slices defined. After each sub-integration time slice, one might decide to carry out dump operation, a common mode reset operation or both. After each integration time slides, the roles of "A" and "B" within the differential detector 70' may be alternated by interchanging the clock signals for "A" and for "B" (or changing the phase of optical energy emitted by 40 (see FIGS. 2, 23) light by 180° which has the same effect). Such clock signal interchange produces at the output of detector 70' a differential signal that, to the first order, is the inverse of the differential signal at the previous sub-integration time slice. Note that the DUMP B-related transistor switches couple operational amplifier 210 with the non-inverting and inverting input terminals switched with respect to DUMP A. As a result the signal that accumulates on integration capacitor C229 accumulates in additive fashion. This feature advantageously substantially reduces many errors associated with offsets and the like. As a result of this feature, reliance upon 0°, 180° cancellation in different detection signal captures is reduced. This improvement follows because both 0° and 180° phases are used within a common capture (e.g., at a close time interval perhaps on the order of a mS or so) to cancel errors.

Note too that additional functionality results from the presence of operational amplifier 210. For example, this amplifier may be used for two purposes: to enhance common mode reset as noted above, and for pixel detector analog-to-digital conversation using techniques well known in the art. Other secondary uses of the operational amplifier can include dynamic range enhancement, 0°, 180° cancellation, 0°, 90° capture, and so on.

Some exemplary parameters for the embodiment of FIG. 12 not stated above will now be given. Capacitor C240 is nominally about half the value of integration capacitor 240, e.g., about 20 fF, where storage capacitors $C_A$ and $C_B$ are each about 60 fF. Exemplary fabrication data for transistors $T_{fA}$, $T_{fB}$ are about 0.5 μ/0.356 μ, transistors $T_{rA}$, $T_{rB}$ are about 1.5 μ/0.6 μ, transistors $T_{refA}$, $T_{refB}$, $T_{resetA}$, $T_{resetB}$ are about 0.42 μ/0.6 μ, transistors $T_{shutA}$, $T_{shutB}$ are about 0.42 μ/0.6 μ, and the four transistors associated with capacitors C220, C240 are each about 2 μ/0.6 μ.

FIG. 13 depicts various oscilloscope traces for AMP IN, AMP OUT and DUMP A waveforms as a function of time for a received detector light phase such that the AMP OUT signal increases with time. The integration period T in FIG. 13 is approximately 18 ms. The uppermost waveform is the AMP A or BITLINE B signal, which represents the accumulated differential between charge on capacitor $C_A$ and capacitor $C_B$ during the integration time T. It is seen that the AMP OUT signal approximates a stair-step waveform that increases every time DUMP A is turned on. The resetting of AMP IN and AMP OUT to the reference voltage preceding each reset occurring at events $\Phi_F$, is shown superimposed on the DUMP A reset signals. It is understood that when $\Phi_F$ is active, high in this example, active reset signals are also present at $\Phi_{SW}$, $\Phi_{norm}$, and so forth. In FIG. 13, waveforms just preceding events ΦF are read actions, for which the non-inverting operational amplifier input is coupled to $V_{ref3}$. For ease of illustration, magnitude of $V_{ref3}$ is intentionally shown as being different than magnitude of the reset voltage.

Figure 14:
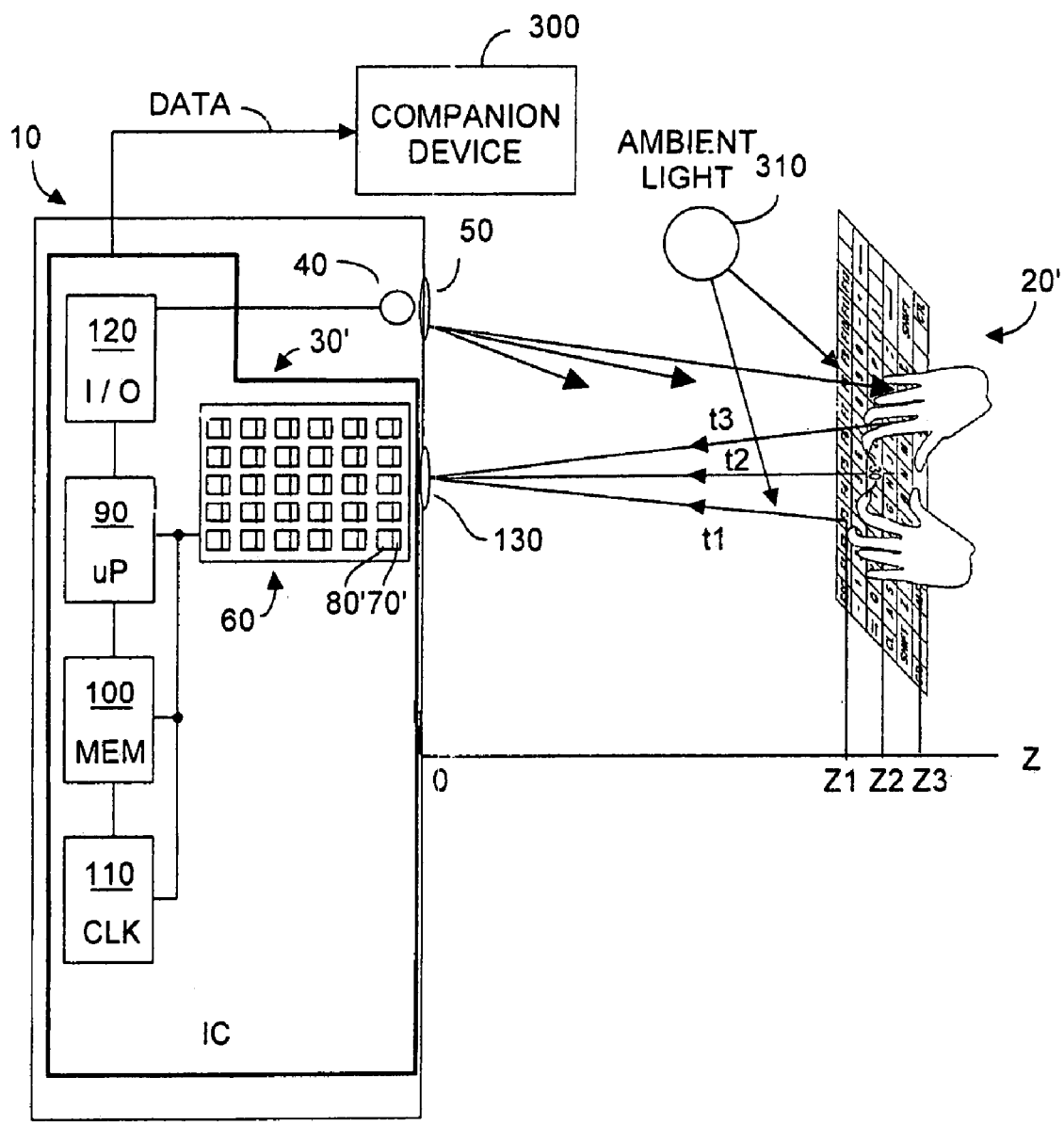
FIG. 14 depicts a range finding type system using improved common mode rejection and differential signal retention pixel detectors, according to the present invention.

FIG. 14 is a block diagram of a range finding system 10 using differential pixel detectors 70' and associated electronics 80' according to any of the embodiments described herein. In FIG. 14, target object 20' is an image of an input device, for example an image of a computer keyboard. The image may be printed on a piece of paper or may in fact be optically projected from within system 10. However presented, target object 20' is visible to a user who can type upon the image as though it were a real keyboard. System 10 can measure in three-dimensions the location of whichever virtual keys are typed upon by the user, and in what time order, e.g., did the user type "am" or "ma". This information, which can be obtained even in strong ambient light, can then be passed to a companion device 200, perhaps a cellular telephone, a PDA, a computer, etc. In another application, target object 20' might be an occupant of the front passenger seat in a motor vehicle. System 10 can discern whether the occupant is an adult, a child, an infant, etc., even in strong ambient light. In such application, companion device 200 might be the control electronics for an air bag supplemental restraint system within the car. The control electronics can then intelligently deploy the air bag in one manner if the occupant to be protected is an adult, and can deploy differently if the occupant is a small child. It is understood that sensors 70' in FIG. 14 preferably include the features described with respect to FIG. 12 to improve common mode rejection and differential signal retention, according to the present invention. It is understood that components in FIG. 12 that are not detector 70' may be deemed to be dedicated per-pixel electronics 80' in FIG. 14. It is also understood that proper operation of the system shown in FIG. 14 should occur even in the presence of large magnitude ambient light 310.

Although various embodiments of the present invention have been described in the context of dynamic range enhancement for three-dimensional image sensing, it is understood that embodiments of the present invention may be used in other applications that require dynamic range enhancement in the presence of a strong common mode signal. Further, those skilled in the art will appreciate that some or all of the described embodiments may be implemented with components other than the specific semiconductor switches, amplifiers, comparators, integrators, counters, etc. described herein.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method to increase effective differential dynamic range and common mode rejection for a differential pixel detector responsive to optical energy having a common mode component, the differential pixel detector including a first photodetector and an associated first capacitor, and a second photodetector and an associated second capacitor, the method comprising:

(a) within an interval preceding start of an integration time T, setting voltage on each said capacitor to a reference voltage whose amplitude is substantially constant during said interval, but which reference voltage can have a substantially constant but different amplitude during another proceeding said interval;

(b) during said integration time T, integrating photocurrent generated by said first photodetector in said first capacitor, and integrating photocurrent generated by said second photodetector in said second capacitor;

(c) within said integration time T, before voltage developed across either said first capacitor or said second capacitor attains a saturation voltage Vsat associated with said differential pixel detector, setting the developed voltage on each said capacitor such that differential pixel detector signal is still determinable; and (d) within said integration time T and prior to step (c), transferring and storing at least a fraction of charge differential between charge on said first capacitor and charge on said second capacitor so as to isolate and preserve magnitude of differential detection charge so transferred and stored from any subsequent resetting operation at step (c).

2. The method of claim 1, wherein step (d) includes switchingly coupling an operational amplifier configured as an integrator having at least one integration feedback capacitor and having first and second differential inputs respectively coupleable to said first capacitor and said second capacitor, said operational amplifier outputting a signal proportional to charge transferred and stored at step (d).

3. The method of claim 1, wherein step (d) includes switchingly coupling an operational amplifier configured as an integrator having an integration feedback capacitor and having first and second differential inputs respectively coupleable to outputs from said differential photodetector, said operational amplifier outputting a signal proportional to charge transferred and stored at step (d).

4. The method of claim 1, wherein step (d) includes storing said at least a fraction of charge in a third capacitor.

5. The method of claim 1, where within said integration time T, step (b) is carried out at least as many times as step (d).

6. The method of claim 1, where within said integration time T, step (d) is carried out at least as many times as step (b).

7. The method of claim 1, wherein said fraction is at least about 50%.

8. A method to increase effective differential dynamic range and common mode rejection for a differential pixel detector responsive to optical energy having a common mode component, the differential pixel detector including a first differential output and an associated first capacitor, and a second differential output and an associated second capacitor, the method comprising:

(a) within an interval preceding start of an integration time T, setting voltage on each said capacitor to a reference voltage whose amplitude is substantially constant during said interval, but which reference voltage can have a substantially constant but different amplitude during another preceding said interval;

(b) during said integration time T, integrating said first differential output in said first capacitor, and integrating said second differential output in said second capacitor;

(c) within said integration time T, before voltage developed across either said first capacitor or said second capacitor attains a saturation voltage Vsat associated with said differential pixel detector, setting the developed voltage on each said capacitor such that differential pixel detector signal is still determinable; and (d) within said integration time T and prior to step (c), transferring and storing at least a fraction of charge differential between charge on said first capacitor and charge on said second capacitor so as to isolate and preserve magnitude of differential detection charge so transferred and stored from any subsequent resetting operation at step (c).

9. The method of claim 8, wherein step (d) includes switchingly coupling an operational amplifier configured as an integrator having at least one integration feedback capacitor and having first and second differential inputs respectively coupleable to said first capacitor and said second capacitor, said operational amplifier outputting a signal proportional to charge transferred and stored at step (d).

10. The method of claim 8, wherein step (d) includes switchingly coupling an operational amplifier configured as an integrator having at least one integration feedback capacitor and having first and second differential inputs respectively coupleable to outputs from said differential photodetector, said operational amplifier outputting a signal proportional to charge transferred and stored at step (d).

11. The method of claim 8, wherein step (d) includes storing said at least a fraction of charge in a third capacitor.

12. The method of claim 8, where within said integration time T, step (b) is carried out at least as many times as step (d).

13. The method of claim 8, where within said integration time T, step (d) is carried out at least as many times as step (b).

14. The method of claim 8, wherein said fraction is at least about 50%.

15. A system to increase effective differential dynamic range and common mode rejection in a differential pixel detector responsive to optical energy having a common mode component, the differential pixel detector including a first differential output and an associated first capacitor, and a second differential output and an associated second capacitor, the system comprising:

means for inhibiting said first capacitor and said second capacitor from exceeding a saturation voltage Vsat associated with said differential pixel within an integration time T such that differential pixel detector signal is still determinable; and means for transferring and storing at least a fraction of charge differential between charge on said first capacitor and charge on said second capacitor so as to isolate and preserve magnitude of differential detection charge so transferred and stored from being affected by operation of said means for inhibiting.

16. The system of claim 15, wherein said fraction is at least about 50%.

17. The system of claim 15, wherein within an interval preceding start of said integration time T, said means for inhibiting sets voltage on said first capacitor and voltage on said second capacitor to a reference voltage whose amplitude is substantially constant during said interval, but which reference voltage can have a substantially constant but different amplitude during another proceeding said interval.

* * * * *